United States Patent
Cheh et al.

(10) Patent No.: US 12,483,589 B1
(45) Date of Patent: *Nov. 25, 2025

(54) SYSTEM AND METHOD FOR UTILIZING DHCP RELAY TO ACCOMPLISH QUARANTINING CLIENT ENDPOINTS IN A RANSOMWARE PROTECTED NETWORK

(71) Applicant: Airgap Networks Inc., Santa Clara, CA (US)

(72) Inventors: Raymond Wing Chon Cheh, Sunnyvale, CA (US); Satish M. Mohan, San Jose, CA (US); Vinay Adavi, Sunnyvale, CA (US); Ritesh R. Agrawal, San Jose, CA (US)

(73) Assignee: Zscaler, Inc., San Jose, CA (US)

(*) Notice: Subject to any disclaimer, the term of this patent is extended or adjusted under 35 U.S.C. 154(b) by 208 days.

This patent is subject to a terminal disclaimer.

(21) Appl. No.: 18/346,078

(22) Filed: Jun. 30, 2023

Related U.S. Application Data

(63) Continuation-in-part of application No. 18/064,177, filed on Dec. 9, 2022, now Pat. No. 11,916,957, which is a continuation-in-part of application No. 17/521,092, filed on Nov. 8, 2021, now abandoned, which is a continuation of application No. 17/387,615, filed on Jul. 28, 2021, now Pat. No. 11,323,474, and a continuation of application No.
(Continued)

(51) Int. Cl.
*H04L 9/40* (2022.01)
*H04L 61/5014* (2022.01)

(52) U.S. Cl.
CPC ...... *H04L 63/1441* (2013.01); *H04L 61/5014* (2022.05); *H04L 63/1408* (2013.01)

(58) Field of Classification Search
None
See application file for complete search history.

(56) References Cited

U.S. PATENT DOCUMENTS

| | | | |
|---|---|---|---|
| 6,611,925 | B1 | 8/2003 | Spear |
| 6,914,905 | B1 | 7/2005 | Yip et al. |
| 8,055,800 | B1 | 11/2011 | Bardzil et al. |

(Continued)

FOREIGN PATENT DOCUMENTS

| | | |
|---|---|---|
| CA | 2826385 A1 | 8/2012 |
| CN | 109450959 A | 3/2019 |

(Continued)

OTHER PUBLICATIONS

Thapa, Manish, "Mitigating Threats in IoT Network Using Device Isolation", Maste• s Thesis, Feb. 4, 2018, 73 pgs.
(Continued)

*Primary Examiner* — Christopher C Harris
(74) *Attorney, Agent, or Firm* — Baratta Law PLLC; Lawrence A. Baratta, Jr.; Ryan Odessa

(57) ABSTRACT

A technique to stop lateral movement of ransomware between endpoints in a VLAN is disclosed. A security appliance is set as the default gateway for intra-LAN communication by overwriting the DHCP responses. Message traffic from compromised endpoints is detected. Attributes of ransomware may be detected in the message traffic, as well as attempts to circumvent the security appliance. Compromised devices may be quarantined by assigning them the default gateway to a preset blackhole IP address.

14 Claims, 22 Drawing Sheets

Related U.S. Application Data

17/357,757, filed on Jun. 24, 2021, now Pat. No. 11,171,985.

(56) References Cited

U.S. PATENT DOCUMENTS

| | | |
|---|---|---|
| 8,312,270 B1 | 11/2012 | Chou |
| 8,347,349 B1 | 1/2013 | Wilson |
| 8,683,052 B1 | 3/2014 | Brinskelle |
| 8,850,185 B1 | 9/2014 | Vaughn |
| 8,869,259 B1 | 10/2014 | Udupa |
| 9,225,736 B1 | 12/2015 | Roundy |
| 9,282,114 B1 | 3/2016 | Dotan |
| 9,306,965 B1 | 4/2016 | Grossman et al. |
| 9,602,529 B2 | 3/2017 | Jones et al. |
| 9,712,504 B2 | 7/2017 | Kurmala |
| 9,756,061 B1 | 9/2017 | Roeh |
| 10,298,599 B1 | 5/2019 | Zhang |
| 10,454,950 B1 | 10/2019 | Aziz |
| 11,030,311 B1 | 6/2021 | Lopez |
| 11,093,139 B1 | 8/2021 | Karr et al. |
| 11,171,985 B1 | 11/2021 | Agrawal |
| 11,240,242 B1 | 2/2022 | Celik |
| 11,252,183 B1 | 2/2022 | Agrawal |
| 11,303,669 B1 | 4/2022 | Agrawal |
| 11,303,673 B1 | 4/2022 | Agrawal |
| 11,323,474 B1 | 5/2022 | Agrawal |
| 11,374,964 B1 | 6/2022 | Agrawal |
| 11,818,176 B1 | 11/2023 | Wu |
| 2003/0212907 A1 | 11/2003 | Genty |
| 2006/0028996 A1 | 2/2006 | Huegen |
| 2006/0031483 A1* | 2/2006 | Lund .................. H04L 63/0236 709/224 |
| 2007/0101432 A1 | 5/2007 | Carpenter |
| 2008/0184157 A1 | 7/2008 | Selig |
| 2009/0217346 A1 | 8/2009 | Manring |
| 2009/0328209 A1 | 12/2009 | Nachenberg |
| 2010/0069127 A1* | 3/2010 | Fiennes ............ H04W 52/0274 455/574 |
| 2010/0281159 A1 | 11/2010 | Boscolo |
| 2012/0079122 A1 | 3/2012 | Brown |
| 2013/0298242 A1 | 11/2013 | Kumar |
| 2014/0020053 A1 | 1/2014 | Kay |
| 2014/0059642 A1 | 2/2014 | Deasy |
| 2015/0281172 A1 | 10/2015 | He |
| 2016/0197962 A1 | 7/2016 | Winn |
| 2016/0323318 A1 | 11/2016 | Terrill et al. |
| 2016/0337397 A1* | 11/2016 | Li .......................... H04L 67/02 |
| 2017/0039310 A1 | 2/2017 | Wang |
| 2017/0085530 A1 | 3/2017 | Volkov |
| 2017/0093910 A1 | 3/2017 | Gukal |
| 2017/0149775 A1 | 5/2017 | Bachar et al. |
| 2017/0289134 A1 | 10/2017 | Bradley |
| 2017/0289191 A1 | 10/2017 | Thioux |
| 2017/0339190 A1 | 11/2017 | Epstein |
| 2017/0339250 A1 | 11/2017 | Momchilov |
| 2017/0344743 A1 | 11/2017 | Shi |
| 2018/0013788 A1 | 1/2018 | Vissamsetty |
| 2018/0097831 A1* | 4/2018 | Uppal ................ H04L 63/0428 |
| 2018/0097840 A1 | 4/2018 | Murthy |
| 2018/0124085 A1 | 5/2018 | Frayman |
| 2018/0189508 A1 | 7/2018 | Li |
| 2018/0324201 A1 | 11/2018 | Lowry |
| 2019/0116193 A1 | 4/2019 | Wang |
| 2019/0166152 A1 | 5/2019 | Steele |
| 2019/0245831 A1 | 8/2019 | Petit |
| 2019/0253432 A1 | 8/2019 | Ohtani |
| 2019/0312836 A1 | 10/2019 | Phillips |
| 2019/0332765 A1 | 10/2019 | Fu |
| 2020/0137110 A1 | 4/2020 | Tyler |
| 2020/0145416 A1 | 5/2020 | Mitzimberg |
| 2020/0228547 A1 | 7/2020 | Kottapalli |
| 2020/0356664 A1 | 11/2020 | Maor |
| 2020/0404007 A1 | 12/2020 | Singh |
| 2021/0058395 A1 | 2/2021 | Jakobsson |
| 2021/0136037 A1 | 5/2021 | Balasubramaniam |
| 2021/0152595 A1 | 5/2021 | Hansen et al. |
| 2021/0160275 A1 | 5/2021 | Anderson |
| 2021/0194894 A1 | 6/2021 | Anderson |
| 2021/0218770 A1 | 7/2021 | Ben-Yosef |
| 2021/0264233 A1 | 8/2021 | Gronat |
| 2021/0273953 A1 | 9/2021 | Fellows |
| 2021/0280315 A1 | 9/2021 | Woldenberg |
| 2021/0336933 A1 | 10/2021 | Shah |
| 2021/0344667 A1 | 11/2021 | Huston, III |
| 2021/0400057 A1 | 12/2021 | Devane |
| 2022/0029965 A1 | 1/2022 | Chanak |
| 2022/0060498 A1 | 2/2022 | Head, Jr. |
| 2022/0217133 A1 | 7/2022 | Montgomery |
| 2022/0217169 A1 | 7/2022 | Varanda |
| 2022/0229906 A1 | 7/2022 | Balek |
| 2022/0329585 A1 | 10/2022 | Chhabra |
| 2022/0360983 A1 | 11/2022 | Raman |
| 2022/0368689 A1 | 11/2022 | Ben-Noon |
| 2022/0393943 A1 | 12/2022 | Pangeni |
| 2022/0398321 A1 | 12/2022 | Baldwin |
| 2022/0408255 A1 | 12/2022 | Howe |
| 2023/0079444 A1 | 3/2023 | Parla |
| 2023/0247003 A1 | 8/2023 | Chanak |
| 2023/0308458 A1 | 9/2023 | Varsanyi |

FOREIGN PATENT DOCUMENTS

| | | |
|---|---|---|
| CN | 114143034 A | 3/2022 |
| CN | 115396230 A | 11/2022 |
| EP | 1844399 B1 | 6/2019 |
| TW | M623435 | 2/2022 |
| WO | 2005125084 A1 | 12/2005 |
| WO | 2008074621 A1 | 6/2008 |
| WO | 2016191376 A1 | 12/2016 |
| WO | 2018157247 A1 | 9/2018 |
| WO | 2021009645 A1 | 1/2021 |

OTHER PUBLICATIONS

International Search Report and Written Opinion for PCT/US2020/020593, mailed Apr. 15, 2020, 8 pgs.

International Preliminary Report on Patentability for PCT/US2020/020593, Completed May 18, 2021, 8 pgs.

* cited by examiner

Network Administration

Client requesting an address that is already in use or requesting a different address than its reserved address Client requesting a renewal an address after the client is reassigned a different reserved address DHCP Relay is instructed to reject onboarding of a client DHCP Relay Modified Operations

SYSTEM AND METHOD FOR UTILIZING DHCP RELAY TO ACCOMPLISH QUARANTINING CLIENT ENDPOINTS IN A RANSOMWARE PROTECTED NETWORK

CROSS REFERENCE TO RELATED APPLICATIONS

This application is a continuation-in-part of U.S. patent application Ser. No. 18/064,177, filed Dec. 9, 2022, which is a continuation-in-part of U.S. patent application Ser. No. 17/521,092, filed Nov. 8, 2021, entitled "System and Method to Detect Lateral Movement of Ransomware by Deploying a Security Appliance Over a Shared Network to Implement a Default Gateway with Point-To-Point Links Between Endpoints", which is a continuation of U.S. patent application Ser. No. 17/357,757, filed Jun. 24, 2021, now issued as U.S. Pat. No. 11,171,985 on Nov. 9, 2021, entitled "System and Method to Detect Lateral Movement of Ransomware by Deploying a Security Appliance Over a Shared Network to Implement a Default Gateway with Point-To-Point Links Between Endpoints" and a continuation of U.S. patent application Ser. No. 17/387,615, filed Jul. 28, 2021, now issued as U.S. Pat. No. 11,323,474 on May 3, 2022, entitled "System and Method for Determining Endpoint Compatibility with Subnet Prefix of All-Ones for Lateral Propagation Prevention of Ransomware", which are hereby incorporated by reference in their entirety.

FIELD OF THE INVENTION

The present disclosure generally relates to techniques for ransomware protection. More particularly, the present disclosure is related to providing lateral movement protection from Ransomware in environments such as shared VLAN environments.

BACKGROUND

Ransomware is one of the biggest threats facing the security industry today. Ransomware is a form of malware that infects computer systems. Ransomware is becoming an increasing problem in the computer/network security industry. Ransomware infects a computer system and encrypts files. A ransom is demanded in exchange for a decryption key.

Conventional enterprise security solutions have proved to be inadequate in view of the high-profile ransomware cases of large companies such as the Colonial Pipeline ransomware attack in 2021. The inadequacy of conventional enterprise security solutions is also evidenced by the fact that in 2020 51% of surveyed companies were hit by ransomware attacks.

Firewalls provide inadequate protection against ransomware attacks. In some companies, separate Virtual Local Area Networks (VLANs) are used to segment sections of a company by division as an additional layer of protection. For example, a finance department may have a separate VLAN domain than an engineering department. Or a finance department may have a different VLAN domain than a marketing department. However, this sort of segmentation of VLAN domains by departments doesn't address the problem of lateral movement of Ransomware attacks within a VLAN domain.

One of the reasons for the inadequacy of current enterprise security solutions is the difficulty of protecting against ransomware attacks within a shared VLAN based network architecture. If a device that is part of a shared VLAN broadcast domain is infected by ransomware or malware, there are very few security controls that can be implemented to prevent lateral propagation of the ransomware within the same VLAN network.

Referring to FIG. 1, a firewall 110 provides some limited protection against external ransomware attacks. However, a VLAN network also has east-west communication between endpoint devices 120 in a shared VLAN domain that is forwarded directly by the network router/switch 140. This east-west Intra-LAN communication is not visible to the network firewall 110 deployed up-stream on the network as shown in FIG. 1.

Current security solutions for lateral propagation protection of ransomware are based on endpoint protection. The drawback of these approaches is that it relies on an agent deployed on each endpoint to detect malicious ransomware processes being launched. Deploying and managing these agents is a challenge for IT organizations, and furthermore they cannot be deployed on IoT devices (such as web cameras, printers, and other devices) and are frequently not supported on older versions of operating systems.

Conventional VLAN network architectures have a potential gap in protection associated with lateral movement of ransomware between endpoint devices. Software application on endpoint devices provides only limited protection due to a variety of practical problems in managing software apps on endpoint devices and the presence of other IoT devices at endpoint devices, such as web cameras, printers, etc. There is thus a potential for ransomware to enter the VLAN network and laterally propagate to endpoint devices.

SUMMARY

In one implementation, a smart appliance includes a DHCP relay function. The smart appliance is set as the default gateway for intra-LAN communication for two or more endpoint devices. A subnet mask of 255.255.255.255 is used to set the security appliance as a default gateway for a plurality of endpoint devices of the shared VLAN environment. Message traffic from compromised endpoints is detected. Compromised endpoints may be assigned a blackhole IP address. In some implementations, staged devices may also be assigned a blackhole IP address.

It should be understood, however, that this list of features and advantages is not all-inclusive, and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

Figure 1:
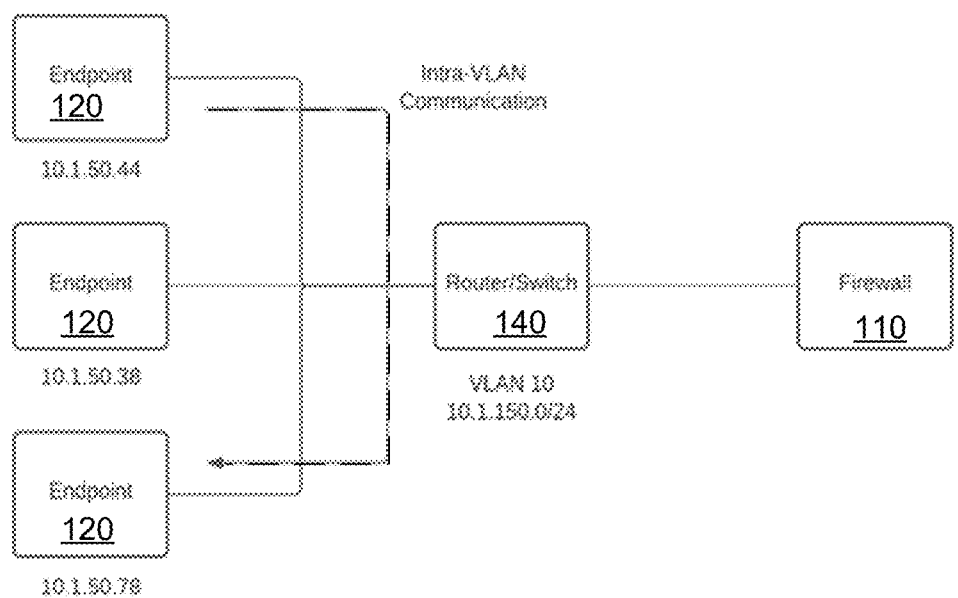
FIG. 1 is a block diagram illustrating Intra-LAN traffic in a conventional VLAN network.
Figure 2:
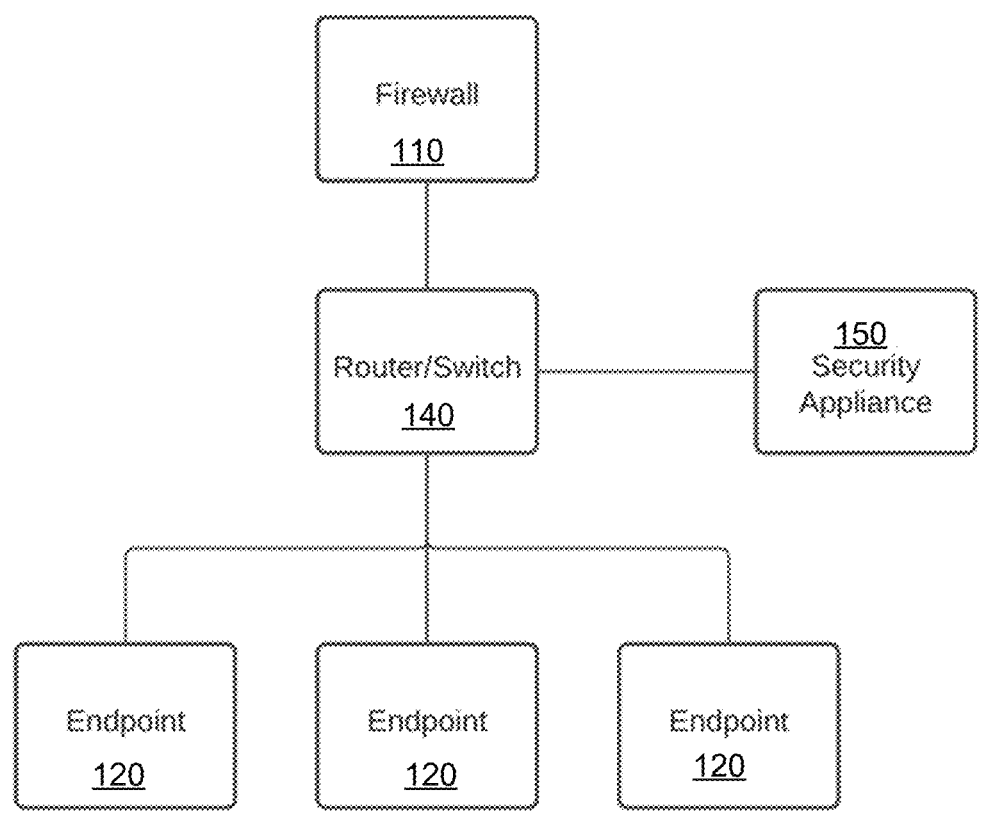
FIG. 2 is a block diagram illustrating a security appliance to provide protection from lateral movement of ransomware in accordance with an implementation.

FIG. 2 is a diagram illustrating a change to a network architecture to prevent lateral propagation of malware and ransomware. The operation of the network router/switch 140 is augmented and enhanced with a security appliance 150. The security appliance could be implemented in a variety of ways, such as using a mixture of hardware and software, firmware, etc. However, in one implementation it is implemented as software that may, for example, be stored on a memory and executed on a computer processor associated with a computing device such as the router/switch. In one implementation, it may be deployed on an existing port (e.g., an access port or a trunk port) of the VLAN network. As an illustrative example, the security appliance 150 may be implemented as software compatible with a virtual machine (VM) implementation, such as within a hypervisor implementation in VMware®. The security appliance may be deployed on a port that allows the security appliance to monitor and control the flow of message traffic across a network node for a plurality of endpoint devices with an individual VLAN domain or even across multiple VLAN domains. Deploying the security appliance on a trunk port is advantageous because a trunk port is a specific type of port on a network switch that allows data to flow across a network node for multiple virtual local area networks or VLANs. However, the security appliance could alternatively be deployed on an access port.

In one implementation, virtual point to point links between a security appliance 150 and each endpoint 120 are established in a shared VLAN domain that forces all traffic from an endpoint to traverse the security appliance 150. In one implementation, the security appliance is deployed on an access port or a trunk port on an existing router or switch.

In one implementation, the security appliance 150 becomes the default gateway and the Dynamic Host Configuration Protocol (DHCP) Relay responsible for relaying IP address requests to the DHCP function on the network and overwriting the subnet mask in the response to a subnet mask comprised of all-ones-255.255.255.255.

When an individual endpoint 120 requests an IP address, the security appliance 150 sets the security appliance as the default gateway for the endpoint. In one implementation, the security appliance responds with a subnet comprised of all-ones-255.255.255.255—and sets itself as the default gateway for the endpoint. Since the endpoint receives an IP address with a subnet mask of 255.255.255.255, any network communication with other endpoints or internet applications needs to be routed via the default gateway. In other words, a network with a subnet mask of 255.255.255.255 puts each device inside its own subnet, which forces them to communicate with the default gateway before communicating with any other device. The 255.255.255.255 subnet mask may also be referred to by the Classless Inter-Domain Routing (CIDR) prefix/32, which has 1 IP address. The CIDR number comes from the number of ones in the subnet mask when converted to binary. The 255.255.255.255 subnet mask corresponds to a CIDR prefix of/32.

Since the security appliance 150 sets itself as the default gateway for the network (by virtue of the subnet mask being comprised of all-ones), any East-West communication between different endpoints 120 and communication between an endpoint 120 and other endpoints 120 or applications on different networks will be routed via it. This provides the security appliance with the unique ability to allow only authorized communication and disallow everything else.

Figure 3:
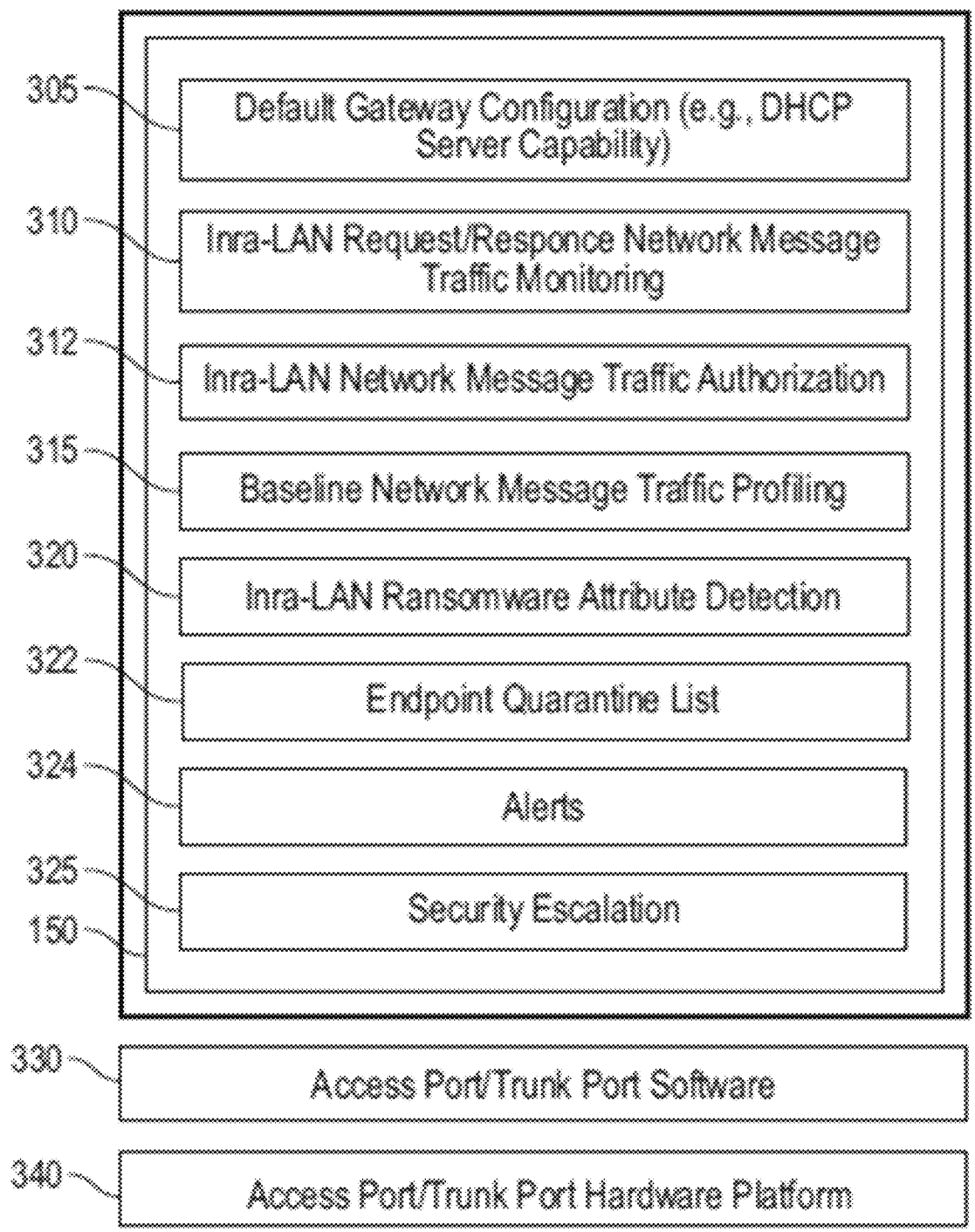
FIG. 3 is a block diagram illustrating components of a security appliance in accordance with an implementation.

FIG. 3 is a high-level diagram illustrating major functional blocks of the security appliance in one implementation. As previously discussed, the security appliance 150 may be deployed in an access port or in a trunk port associated with VLANs for a number of different endpoint devices (e.g., different laptop computers in a VLAN domain). It thus may by implemented as software stored on a computer memory and executable by a processor associated with an access port or a trunk port. For example, it may be implemented as software deployed with the software 330 and hardware 340 environment associated with an access port or a trunk port. In the example of FIG. 3, the security appliance 150 includes a default gateway configuration unit 305 to set the security appliance as a default gateway as described above (e.g., using a subnet mask of 255.255.255.255). An intra-LAN traffic monitoring unit 310 monitors intra-LAN traffic. This can include monitoring both request and response messages in intra-LAN traffic and detecting irregularities in intra-LAN request/response message traffic. An Intra-LAN network message traffic authorization unit 312 allows only authorized communication between the plurality of endpoint devices of the shared VLAN environment. For example, it may block unauthorized communication between endpoints. A baseline traffic profiling unit 315 may be optionally included to develop a baseline profile for typical or normal intra-LAN message traffic patterns between endpoint device 120. For example, the presence of ransomware may generate unusual amounts or types of traffic in comparison to a baseline profile. An Intra-LAN ransomware attribute detection unit 320 determines if one or more intra-LAN messages have computer code indicative of ransomware, such as computer code files to implement file scanning and encryption.

In the example of FIG. 3, the security appliance includes an endpoint quarantine unit 322 to quarantine compromised endpoints. This may include, for example, generating a list of quarantined endpoint devices that are used to block intra-LAN communication for compromised devices (i.e., to stop the lateral movement of ransomware). An alert unit 324 may be included to generate automated alerts, such as generating alerts for an administrator of an attempted ransomware attack. An optional security escalation unit 325 may be included to implement a security escalation protocol to increase security.

It will be understood that while the security appliance 150 may be deployed on an existing VLAN system, in some implementations it may also be incorporated into new VLAN system components, such as being incorporated into an access port or a trunk port.

Figure 4:
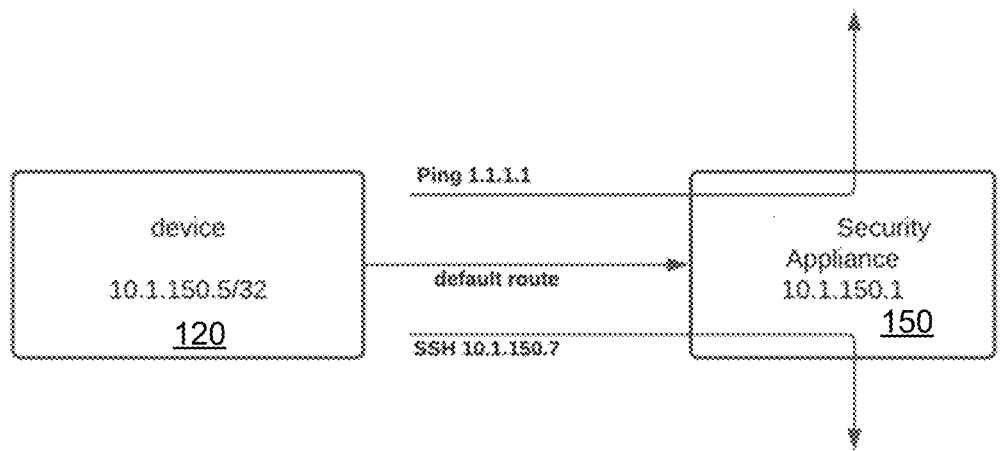
FIG. 4 illustrates the security appliance set as the default gateway in accordance with an implementation.

From the perspective of the endpoint 120, other endpoints and applications appear to be in a different IP network. Hence all outbound packets are sent to the default gateway as shown in FIG. 4. In this example, a/32 subnet is illustrated. However, more generally, a/31 or a/30 subnet may be used. Configuring a/32 subnet mask on endpoints forces all outbound network traffic via the security appliance 150. The security appliance 150 allows only authorized communication between endpoints, thereby significantly reducing the attack surface and lateral propagation by malware and ransomware. Detecting attempts by malicious actors to circumvent the protection provided by the security appliance permits quarantining devices which attempt to do so. Rapid quarantining of compromised endpoint devices stops the lateral propagation of ransomware. This, in turn, reduces the spread and potential damage of a ransomware attack.

Figure 5:
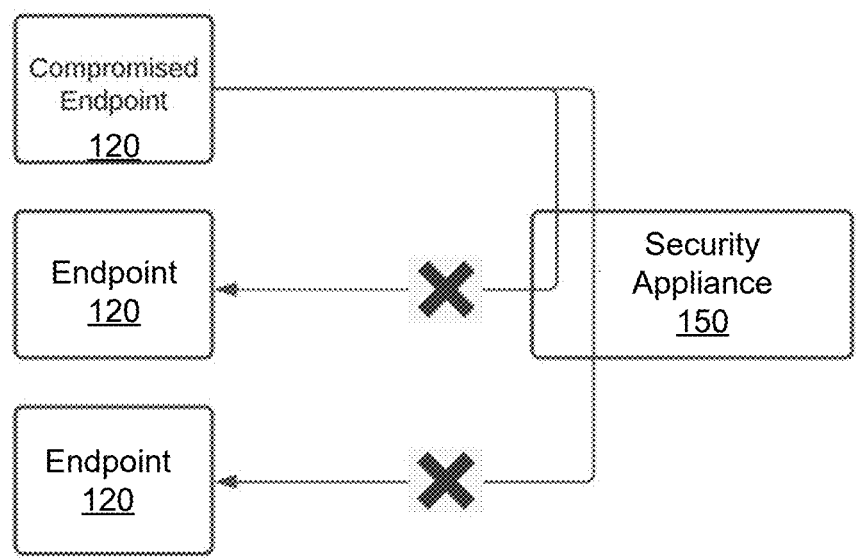
FIG. 5 illustrates how a security appliance may quarantine a compromised endpoint in accordance with an implementation.

FIG. 5 is a high-level block diagram illustrating an example of how lateral propagation of ransomware is prevented in accordance with an implementation. In this example, a compromised endpoint is infected with ransomware. The ransomware may, for example, have entered the compromised endpoint in a variety of different ways, such as through a peripheral IoT device in communication with the compromised endpoint.

Regardless of how the compromised endpoint became infected with ransomware, the security appliance 150 was earlier set as the default gateway. The security appliance 150 monitors message traffic and quarantines suspicious traffic from the compromised endpoint to other endpoints. This may include, for example, detecting message traffic that has attributes associated with ransomware, such as computer code for file scanning or encryption. It may also optionally include, in some implementations, detecting that message traffic that is unusual in comparison to a baseline profile of normal message traffic.

It is possible that ransomware in a compromised endpoint may attempt to directly communicate with another endpoint and bypass the security appliance 150. However, such an attempt to circumvent the security appliance 150 may still be detected and prevented.

Figure 6:
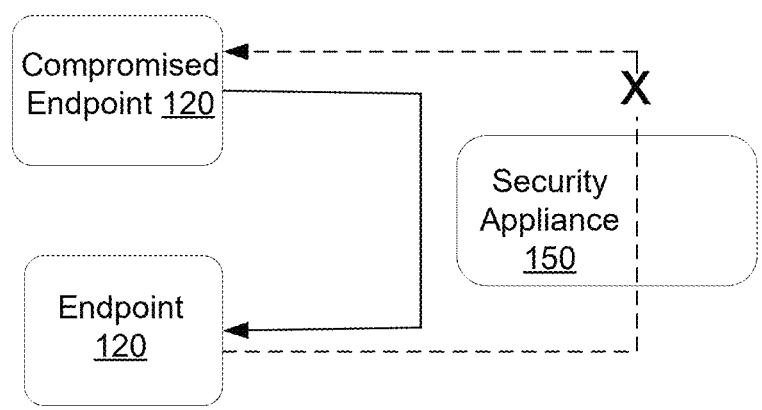
FIG. 6 illustrates how the security appliance may detect compromised endpoints attempting to circumvent the security appliance in accordance with an implementation.

FIG. 6 illustrates an example of how attempts to circumvent protection are detected. A compromised endpoint might, for example, have code in the ransomware that attempts to directly send request messages to another endpoint, bypassing the security appliance 150. However, an uncompromised endpoint will attempt to send its response message to the security appliance 150 as the default gateway. The security appliance 150 determines when it has detected a response from an endpoint directed to another endpoint but for which it has not detected a corresponding request. This discrepancy (a response message but no request message) may be used to identify that a compromised endpoint is attempting to circumvent the protection of the security appliance 150.

Figure 7:
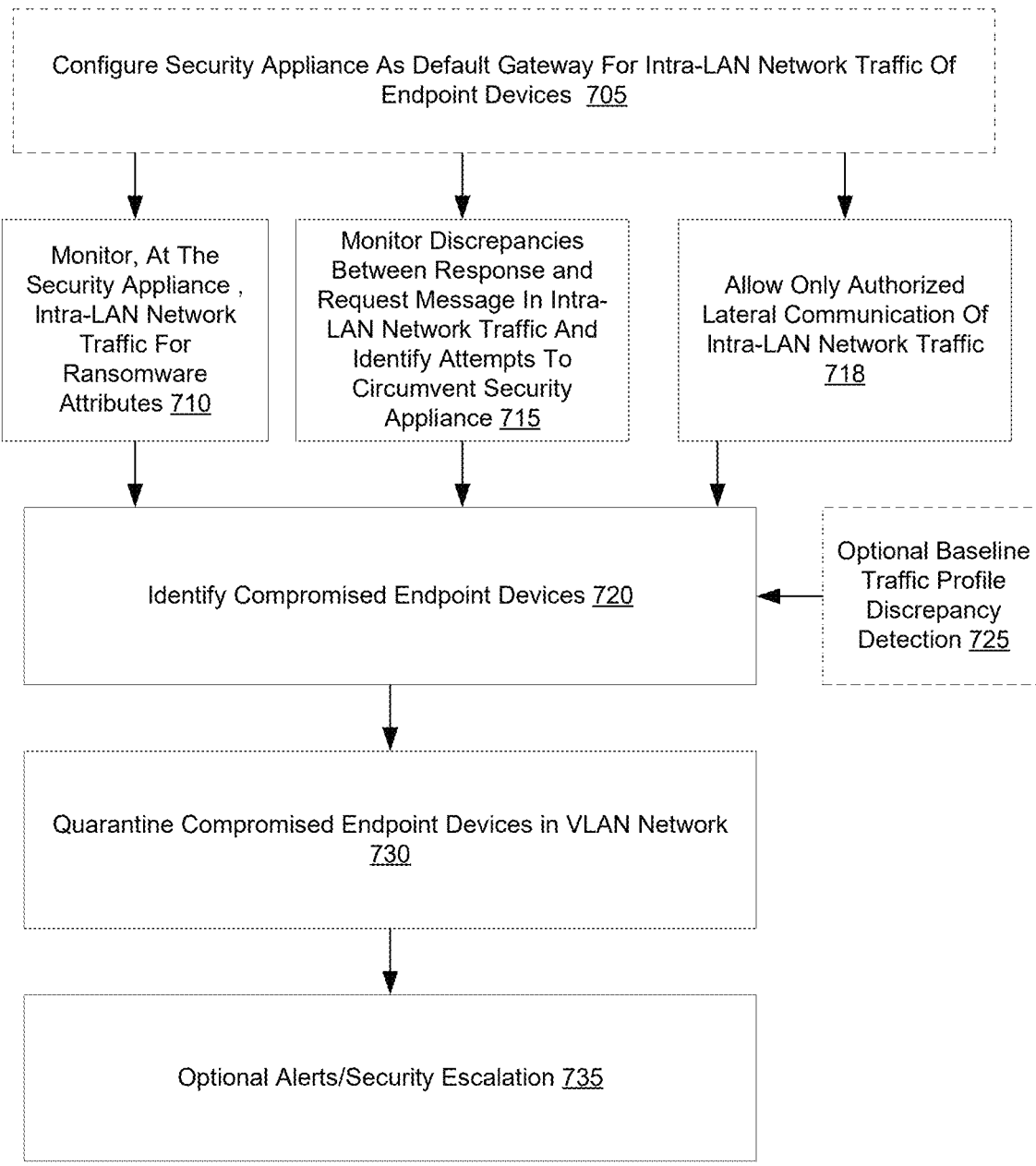
FIG. 7 is a flow chart of an example method for ransomware protection in accordance with an implementation.

FIG. 7 is a flow diagram of a method in accordance with an implementation. In block 705, a security appliance is configured as the default gateway for Intra-LAN network traffic of endpoint device. In block 710, the security appliance monitors intra-LAN network traffic for ransomware attributes. In block 715, the security appliance also monitors the intra-LAN message traffic for discrepancies between response and request messages in intra-LAN network traffic and identify attempts to circumvent the security appliance. In block 718, the method also includes the security appliance allowing only authorized lateral communication of Intra-LAN network traffic. In block 720, compromised endpoint devices are identified based on the outputs of blocks 710 and 715. Optionally, discrepancies with respect to a baseline message traffic profile from block 725 may be considered as an additional factor. In block 730, compromised endpoint devices are quarantined. This may include, for example, placing them on a list of quarantined devices, blocking communication with them, or taking other measures to isolate them. In block 735 optional alerts or security escalation may be performed. Security escalation could, for example, include implementing a security protocol to take a further action to mitigate or minimize the risk of further damage from a ransomware attack.

The security appliance 150 restricts communication in a manner that significantly reduces the attack surface available to the ransomware to exploit vulnerabilities in other endpoints and/or applications and propagate laterally. It detects attempts to circumvent the protection provided by the security appliance. If a compromised endpoint attempts to bypass the default gateway and tries to laterally propagate to another device, this attempt would be detected by the security appliance and appropriate action would be taken. This detection is because the uncompromised endpoint would still send the response packets to the compromised endpoint via the security appliance 150 (due to the/32 default route). The security appliance 150 detects the fact that it has seen a response packet to a request sent by the compromised endpoint, and it alerts the operator in this case. Automatic actions may be taken by the security appliance

150 including quarantining the compromised endpoint so that further lateral propagation is impossible.

DHCP Relay Based Implementations

As previously discussed, a security appliance may be used to protect device endpoints on a shared VLAN network from lateral propagation of malware and ransomware. However, in some implementations the security appliance 150 may be implemented in different ways. In some end-use scenarios, it may be desirable to implement the security appliance to operate in combination with a conventional original DHCP server. For example, in a deployment of the security appliance to upgrade an existing VLAN network, customers may want to ensure that their original DHCP server continues to operate without any changes to it. Also, in some implementations ensuring a graceful failure mode is a key concern. For example, some customers may want assurance that there is a graceful failure mode in the unlikely event that the security appliance 150 temporarily goes down.

Figure 8:
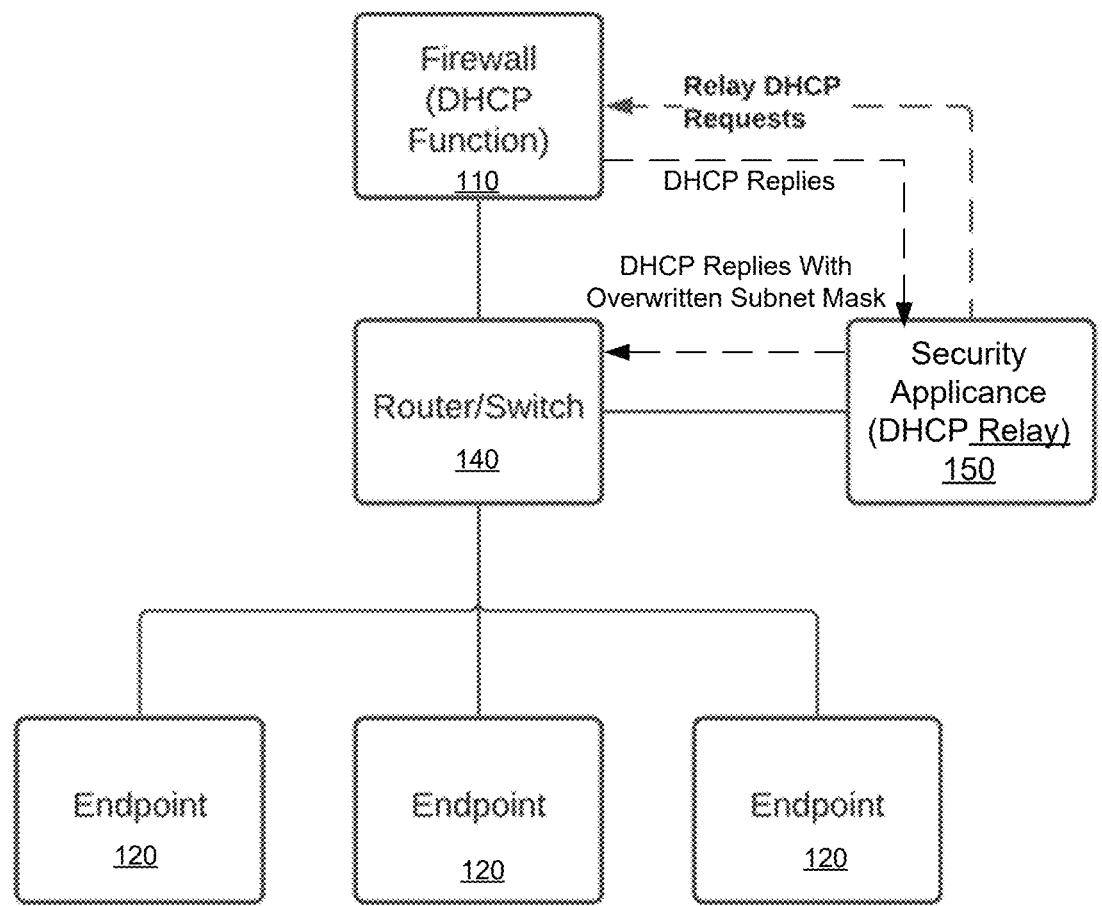
FIG. 8 illustrates an implementation of the security appliance having a DHCP relay function in accordance with an implementation.

FIG. 8 illustrates a deployment architecture in which the security appliance 150 is deployed on a trunk port on the existing router or switch. In this implementation, the security appliance 150 has a DHCP relay function and acts as a DHCP relay for the existing VLAN network. As indicated by the dashed lines, when an endpoint device 120 requests an IP address via a DHCP request, the security appliance 150 acts as a DHCP that relays the DHCP request to the original DHCP server on the network (shown as part of the Firewall function 110). When the response is received from the original DHCP server, the security appliance 150 overwrites the subnet mask in the response with a subnet mask which is comprised of all ones: 255.255.255.255. This results in the security appliance 150 configuring itself as the default gateway for the endpoint by overwriting the router/gateway property in the response. This process continues for all of the endpoints 120 in a VLAN domain. A provisioning or setup process may be optionally used to ensure that all of the endpoint devices request an IP address and use the security appliance as the default gateway.

Figure 9:
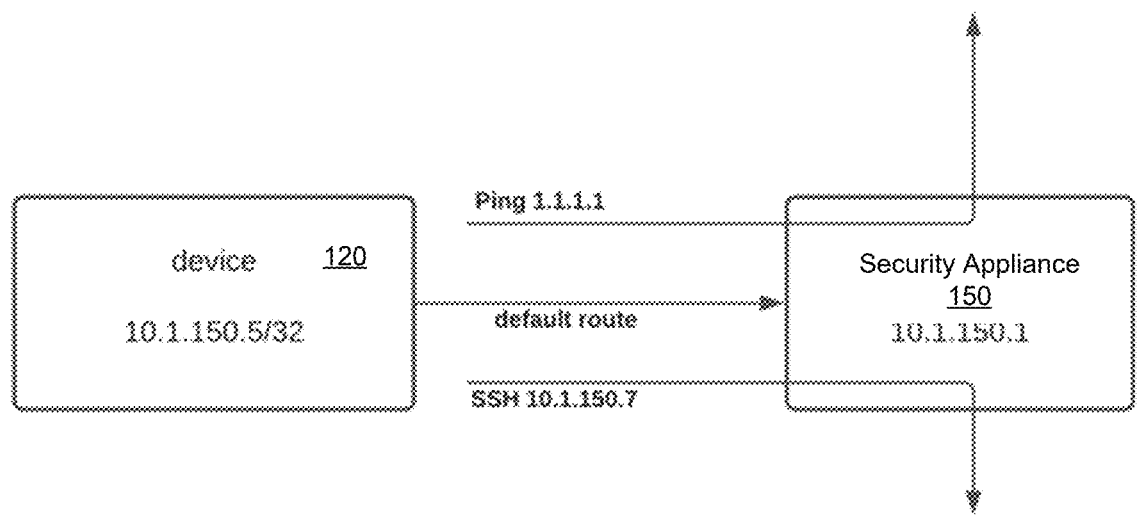
FIG. 9 illustrates a default gateway function in accordance with an implementation.

Since each individual endpoint device receives an IP address with a subnet mask of 255.255.255.255, any network communication with other endpoint devices or internet applications needs to be routed via the default gateway. From the perspective of an individual endpoint, other endpoints, and applications appear to be in a different IP network. Hence all outbound packets are sent to the default gateway as shown in FIG. 9.

Figure 10:
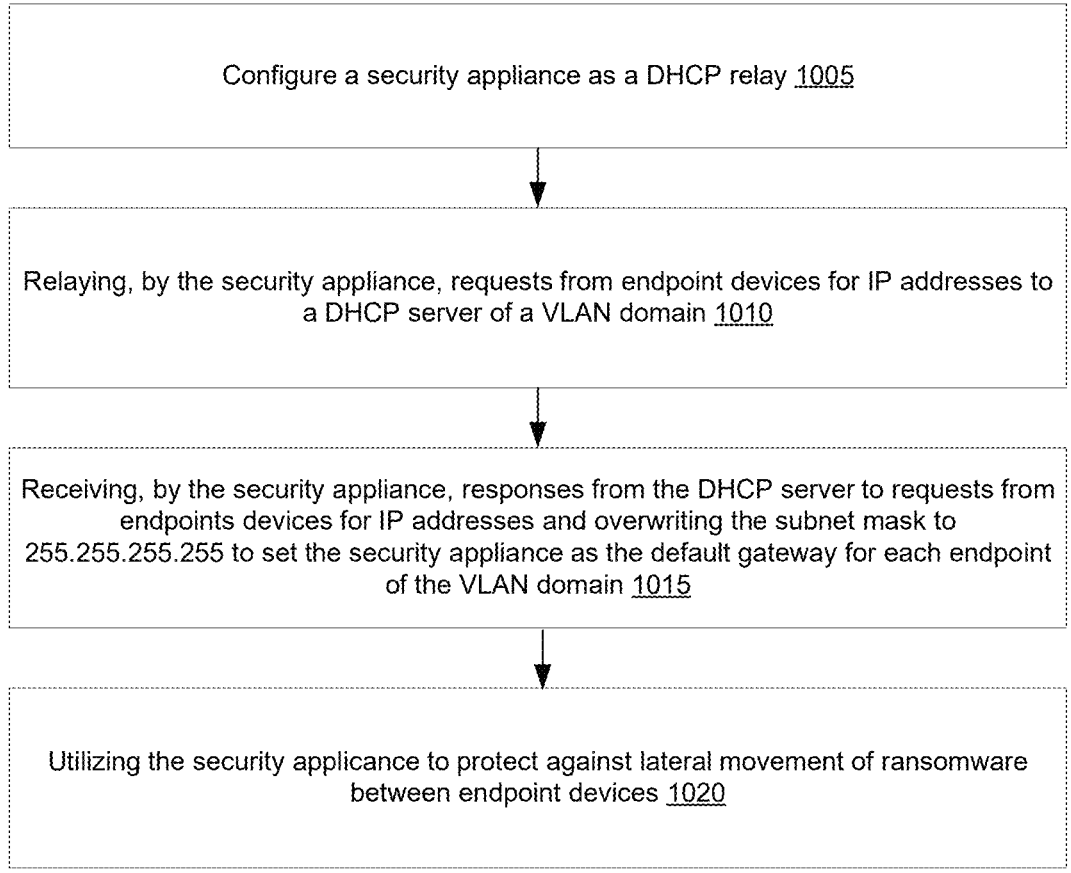
FIG. 10 illustrates a high-level flow chart of a method of using a security appliance with a DHCP relay function to protect against ransomware in accordance with an implementation.

FIG. 10 is a flowchart of a method in accordance with an implementation. In block 1005 a security appliance is configured as a DHCP relay. For example, the security appliance may include a DHCP relay function that is activated when the security appliance is deployed in a VLAN network having a firewall with a DHCP server. In block 1010, in operation the security appliance relays DHCP IP address requests from individual endpoint devices of a VLAN domain to the DHCP server. In block 1015, the security appliance receives DHCP response and overwrites the subnet mask with all ones to 255.255.255.255. This sets the security appliance as the default gateway. In block 1020, the security appliance is used to protect against lateral movement of ransomware between endpoint devices.

Figure 11:
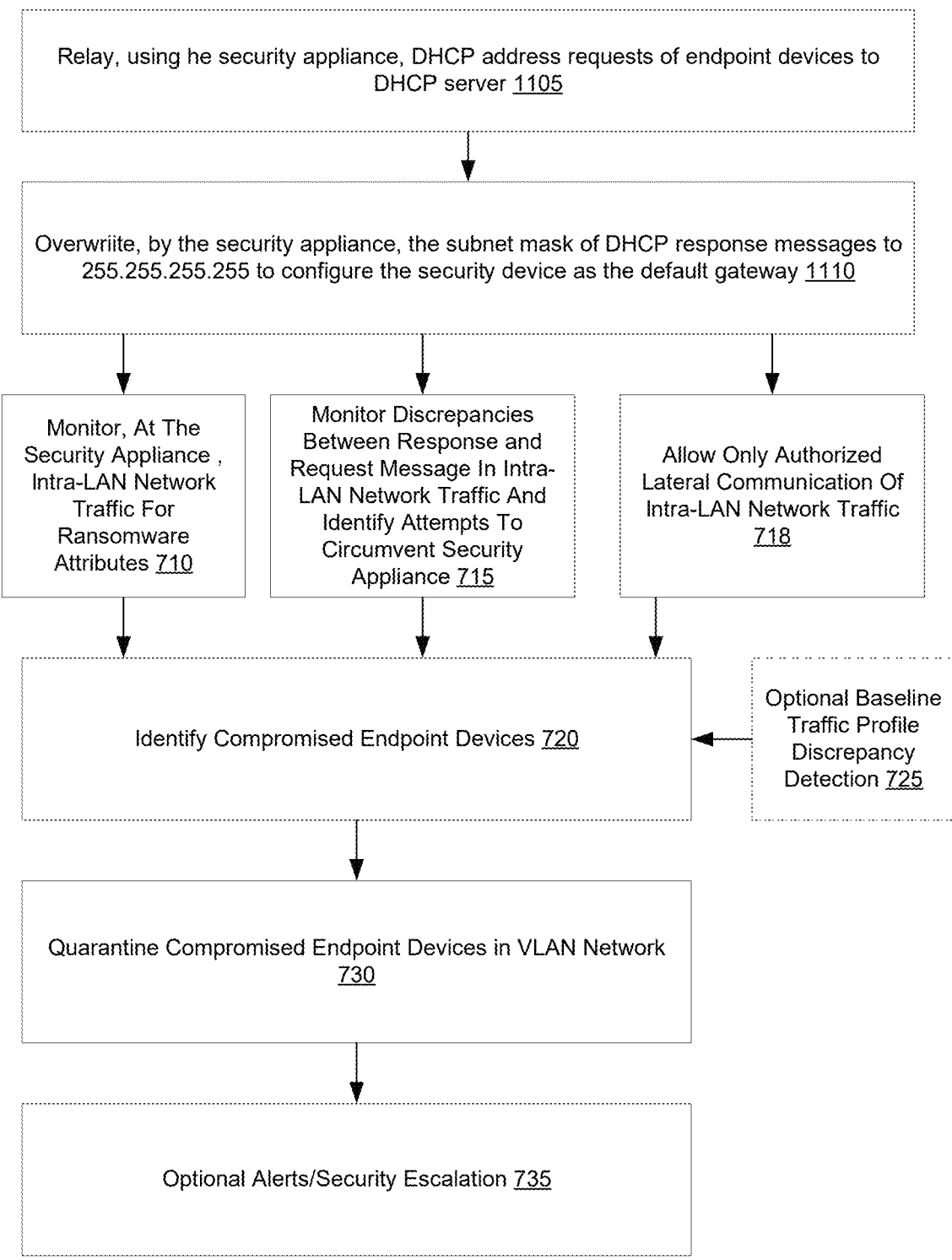
FIG. 11 is a flow chart illustrating how a security appliance with a DHCP relay function can provide a variety of layer of protection similar to that of FIG. 7 in accordance with an implementation.

As illustrated in FIG. 11, the security appliance may be used to implement features described in regard to FIG. 7. The security appliance becomes the default gateway in blocks 1105 and 1110 by virtue in the process of the security appliance relaying DHCP IP address request to the DHCP server (block 1105) and overwriting the subnet mask (block 1110) to set the security appliance as the default gateway.

The particular implementation of the security appliances in FIG. 8 to FIG. 11 increases the overall reliability of the deployment. In the unlikely scenario that the security appliance was to fail, an automated script could reconfigure the network switch so that the original DHCP server assumes the DHCP function in the network. This would ensure seamless downgrade with no downtime.

While failure of the security appliance is an unlikely scenario, ultra-high reliability and graceful failure is important in some end use applications.

DHCP Relay Enhancements to Police DHCP Client Address Assignments

Figure 12:
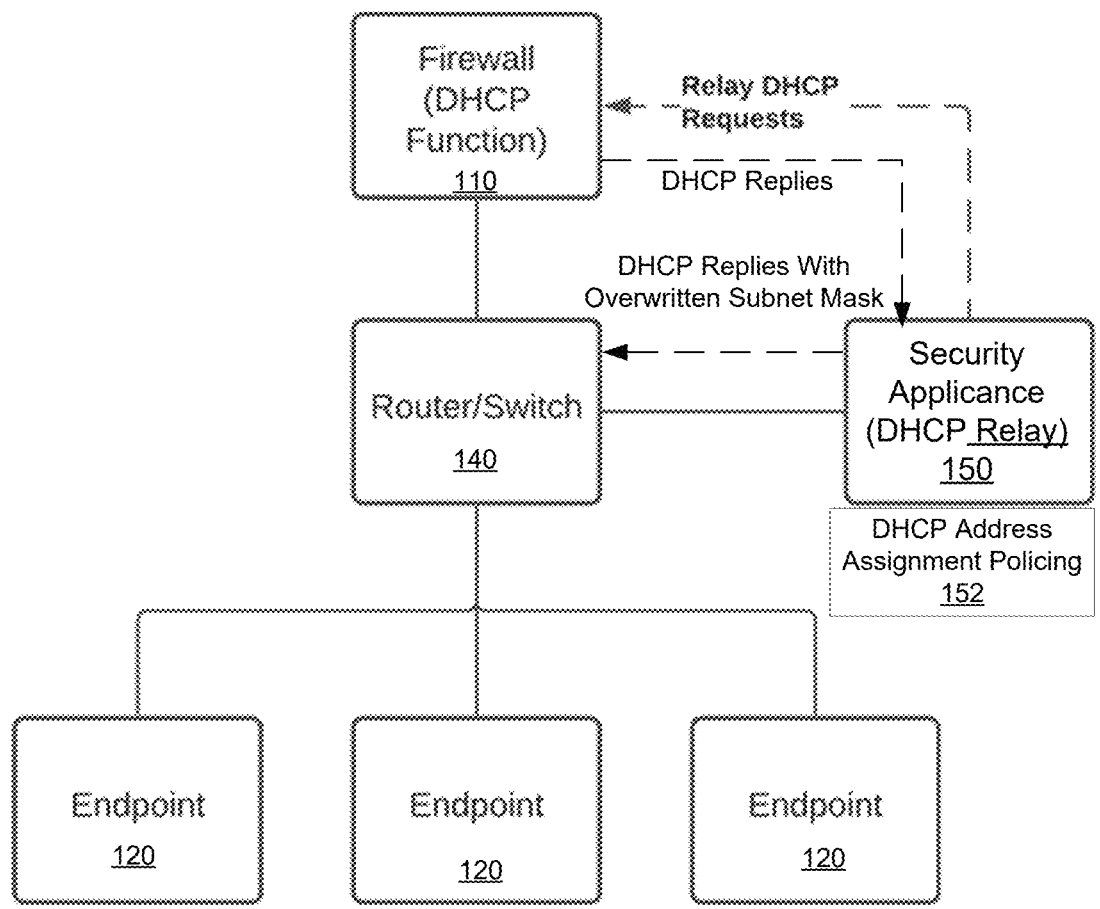
FIG. 12 illustrates an implementation of the security appliance having a DHCP relay function that further provides for policing of DHCP address assignments in accordance with an implementation.

An enhancement to the example of the DHCP relay function of the security application 150 will now be described with regards to FIG. 12. FIG. 12 modifies the example of FIG. 8 to include a DHCP address assignment policing module 152 in the security module 150 having the DHCP relay function. Conventionally, a DHCP relay does not interfere with the IP address requested by a client (ciaddr) or one being assigned by the DHCP server to the client (yiaddr). However, in the implementation of FIG. 12, the DHCP relay function of the security appliance 150 is modified to monitor IP address utilizations of traffic traversing through it and enhance security by ensuring IP addresses being assigned to DHCP client devices are unique, correct, and used in a manner that enhances security. By enforcing a stricter and more precise selection of address assignments, it becomes more difficult for a malevolent device (e.g., one infected with malware) to acquire an address via DHCP.

In one implementation, the security appliance 150, as previously discussed. modifies the subnet mask to 255.255.255.255 for the security appliance to serve as a default secure gateway (SGW) to achieve endpoint isolation. However, referring to FIG. 12, the security appliance 150 in one example includes a DHCP relay function and further includes DHCP Address Assignment Policing Module 152 to inspect DHCP packets and police IP address assignments to further control the endpoints and ensure network connectivity.

The security appliance, which is integrated with the DHCP relay, is in the same broadcast domain/subnet as the clients. It acts as the gateway for all client devices in the broadcast domain/subnet that send packets to each other and outside the VLAN. When a client device requests an address already being used by another device, the DHCP relay can modify the request for an unused/non-reserved IP address.

That is, the security appliance still serves as the DHCP relay, as before, but further includes an additional module 152 to police the client device IP address assignments to provide an additional layer of protection from lateral propagation of ransomware.

The action of the DHCP Address Assignment Policing module 152 to police IP addresses enhances the security of the VLAN by ensuring that the IP addresses being assigned to DHCP client devices are unique and correct. This, in turn, helps to prevent a compromised device from acquiring an address via DHCP.

Module 152 provides additional functions to the DHCP relay for policing addresses that are new and provide an additional layer of protection from ransomware. This is a significant modification to the functionality of the DHCP relay, which normally would merely relay DHCP messages without altering them. However, this approach leverages off of well-known DHCP protocols. For example, the 4 basic steps of DHCP packets include: 1) DHCP Discover, 2)

DHCP Offer, 3) DHCP request, and 4) DHCP Acknowledgement (ACK) or DHCP Negative Acknowledgement (NACK).

At a high level, the process includes examining, by module 152, DHCP packets between the DHCP server and client endpoint devices. The process polices, by the security appliance, 1) IP addresses requested by client endpoint devices, and 2) IP addresses assigned by the DHCP server. This can include policing the client IP addresses (ciaddr) requested by a client endpoint device in the DHCP protocol. It may also include policing the yiaddr IP address the DHCP server offers to a client endpoint device.

Examples of Policing of Address Assignments

For the purposes of generalizing the discussion, we can refer to the endpoint devices as the clients, the security appliance 150 with module 152 as the DHCP relay, and the firewall 110 with the DHCP functionality as the DHCP server.

Note that the DHCP relay is placed in the VLAN such that it can intercept DHCP packets sent by the DHCP server to a client and vice-versa. In one implementation, the ciaddr in the DHCP offer and the ACK are implemented such that when the client device requests an address renewal, the DHCP relay acts as the proxy DHCP server.

In one implementation, the DHCP relay can generate a DHCP NACK to client devices during REQUEST/NACK. In one implementation, the DHCP Relay can modify ciaddr in DISCOVER packet, sent by the client device, to the DHCP server. For the DHCP relay administration, the administration can include adding static, dynamic, and reserved IP address configurations of the DHCP relay. Additionally, the administration can include using banned device MAC addresses by the DHCP relay in policing DHCP address assignments. For the case of static address, conventionally static addresses are not added to DHCP server. However, adding static address information aids the DHCP relay to police DHCP address assignments.

In traditional networks utilizing a DHCP Relay to reach the DHCP server, MAC addresses that should be ignored are added to the DHCP server configuration, which makes them administratively banned. In one implementation, the security appliance (in which the DHCP Relay function resides, is configured to detect devices being compromised with ransomware and malware. The DHCP Relay is configured to stop relaying the DHCP assignments to compromised devices (in addition to configured banned devices), rendering the compromised devices quarantined, thus making the network more secure.

In one implementation, there are 4 basic types of devices in the VLAN in regard to IP addresses:

1. Devices with statically assigned IP addresses. Devices with statically assigned IP addresses have their IP addresses configured on the devices directly. As a consequence, they do not send DHCP requests to the network and do not ask the DHCP server to assign an available address to them. On the DHCP server, the IP addresses of these devices should not be in the DHCP address pool.

2. Devices that are banned from joining the network. The DHCP server should not assign any IP addresses to these devices banned from joining the network. These devices may be administratively configured to be banned. Alternatively, the security appliance may detect that a device is compromised and in response quarantine the device by not assigning it any IP addresses.

3. Devices that have specific addresses to be assigned (DHCP reserved addresses). On the DHCP server, an individual address from the DHCP address pool is preconfigured for each of these devices (identified by the MAC addresses). If the device requests the reserved address, DHCP server normally would ACK such DHCP requests; if the device requests an IP address which is not the reserved address, in this disclosure, the DHCP Relay function on the security appliance would NACK the REQUEST, and the client device would start the DHCP process from DISCOVER again, and the DHCP Relay changes the ciaddr to the RESERVED address 4. Devices in which DHCP IP address assignments are dynamic. These devices may or may not request for specific addresses. If the address is available or previously assigned to the device, the DHCP server would assign the requested address to the device. If not, the DHCP server would assign an unassigned IP address from the DHCP address pool to the device.

The DHCP address pool and reserved address assignments, as well as the ignore booting for banned devices can be configured on the DHCP server. However, in this disclosure these configurations also be supplied to the DHCP relay as well. The IP addresses used by the statically assigned devices would not be part of the DHCP address pool and the security appliance can detect a device has become compromised and with the DHCP Relay running on the security appliance, it can use this information to intentionally drop the DHCP packets to and from the device.

Consider the policing operation for a static address example. In one implementation, when a dynamic client device requests an address that is configured for a different MAC address of a static entry, the DHCP relay sends a NACK to the client device. In this example, the client device should start from DISCOVER and the DHCP server can then offer a different IP address to the client. However, note that the DHCP relay can send a DHCP decline to the DHCP server if it doesn't want the client device to use the offered address.

Consider now the policing operation for a reserved address for the examples of on-boarding and renewal. For the case of onboarding, when a reserved client device requests an address in Discover, there are two options. If the ciaddr is the same as the RESERVED address, the DHCP relay operation is performed as usual. However, if the ciaddr is not the same as the RESERVED address, the DHCP relay changes the ciaddr to the configured reserved address before sending it to the DHCP server. For the case of renewal, when the DHCP relay intercepts the DHCP REQUEST, the DHCP Relay sends the DHCP NACK to the client device if the requested address is not the configured RESERVED address. When the client receives the NACK, the client device will then uninstall the client address and start again from DISCOVER.

Figure 13:
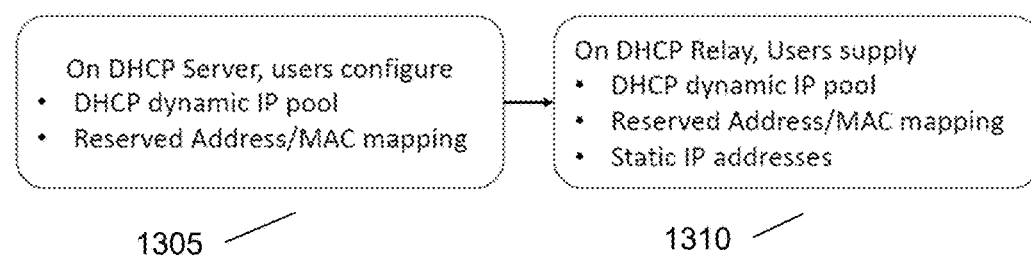
FIG. 13 illustrates configuring of IP addresses in a DHCP server and in the DHCP relay of the security appliance in accordance with an implementation.

Referring to FIG. 13, an operator/user can configure 1305 address pools on the DHCP server for each subnet to be assigned to DHCP clients, including a dynamic IP pool and reserved address/MAC mapping. The DHCP server operation includes operators defining DHCP address pools, with the option to reserve specific IP addresses for specific MAC addresses. On the DHCP relay, a user can also configure 1310 a dynamic IP pool, reserved addresses/MAC mapping, and static IP addresses. In one implementation, within the address pool, addresses can be: 1) dynamically assigned (no preassigned mappings to any specific device), 2) reserved (an IP address is specifically allocated for a MAC address and cannot be used for other MAC addresses), and 3) withheld and not assigned to any devices. Operators provide the same configuration to the DHCP relay.

During operation, the DHCP relay intercepts DHCP Discover and DHCP REQUEST packets the client endpoint device sent to the DHCP server. The DHCP relay is also responsible for relaying the DHCP OFFER, ACK and NACK packets back to the client endpoint devices. In one implementation, the DHCP relay examines the intercepted DHCP packets to make sure that the addresses being requested by clients for the DHCP server, and the addresses being assigned by the DHCP server to the clients are correct and unique in the subnet.

The IP address being requested by the client is the ciaddr. The IP address assigned by the DHCP server to the client is yiaddr. In order to police these IP addresses, in one implementation the DHCP relay is configured to perform the following functions: 1) modify ciaddr requested by a client in a DHCP DISCOVERY/REQUEST; 2) modify yiaddr assigned to a client in a DHCP OFFER; 3) generate DHCP NACK in response to a client DHCP Discover or Request; 4) proactively drop DHCP OFFER/ACK packet being sent to a client; and 5) generate DHCP decline to DHCP server in response to DHCP OFFER.

Figure 14:
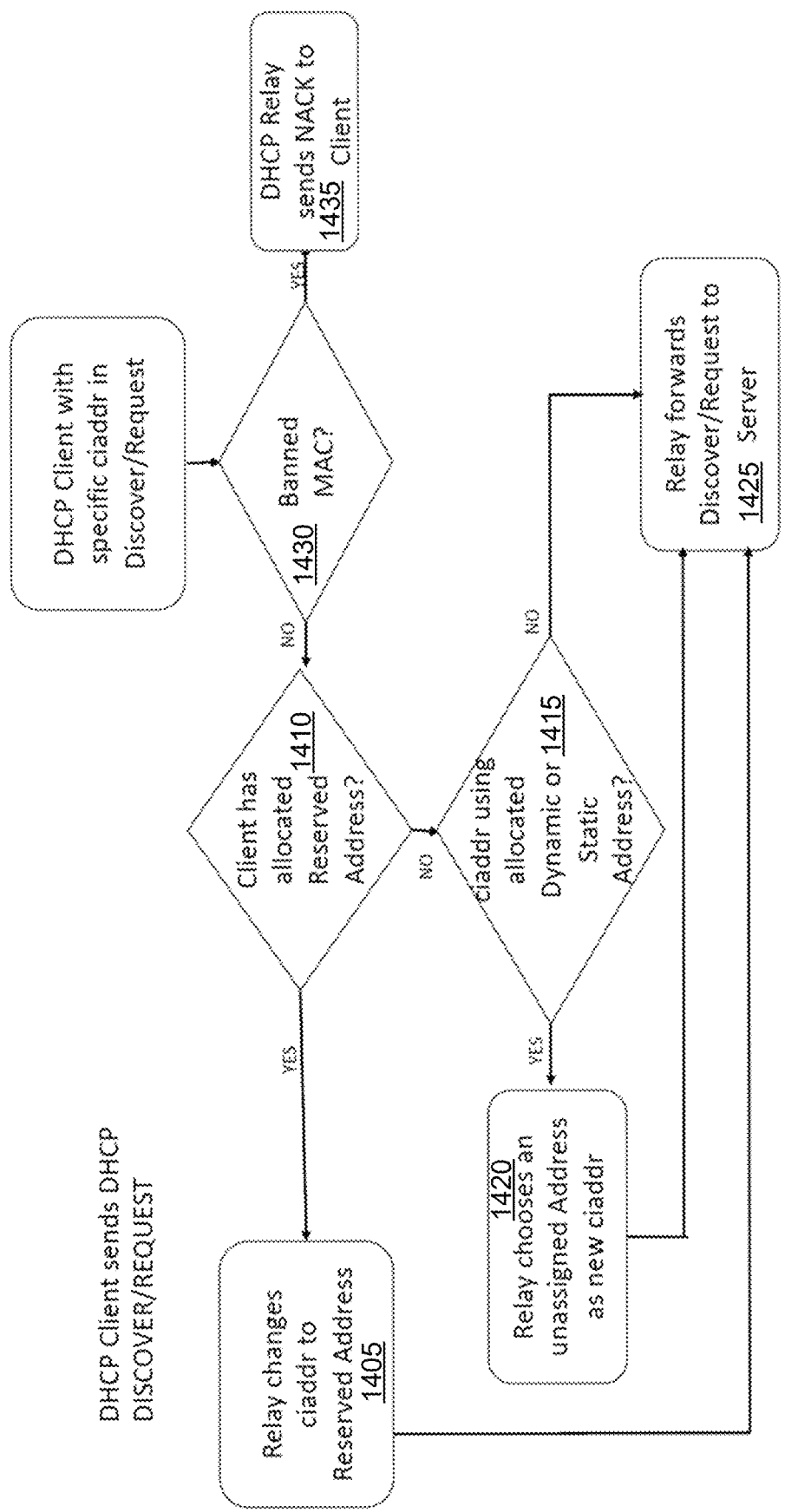
FIG. 14 is a flowchart of an example method related to a DHCP client sending a DHCP Discover/Request in accordance with an implementation.

Referring to FIG. 14, an example flow chart is illustrated for what happens after a DHCP client sends a DHCP DISCOVER/REQUEST. In block 1430, a decision is made whether or not the specific ciaddr in the Discover/Request corresponds to a banned MAC address. If yes, in block 1435 the DHCP relay sends a NACK to the client, thus performing a form of policing that prevents the use of banned MAC addresses.

If the MAC address is not banned, then the method moves to decision block 1410, which determines whether or not the client allocated a reserved address. If yes, the relay changes the ciaddr to the reserved address in block 1405 before forwarding the Discover/Request to the DHCP server in block 1425. If no, in decision block 1415 a decision is made whether the ciaddr uses allocated dynamic or static address. If yes, in block 1420, the relay chooses an unassigned address for the new ciaddr and moves to block 1425. If no, the process moves directly to block 1425.

Figure 15:
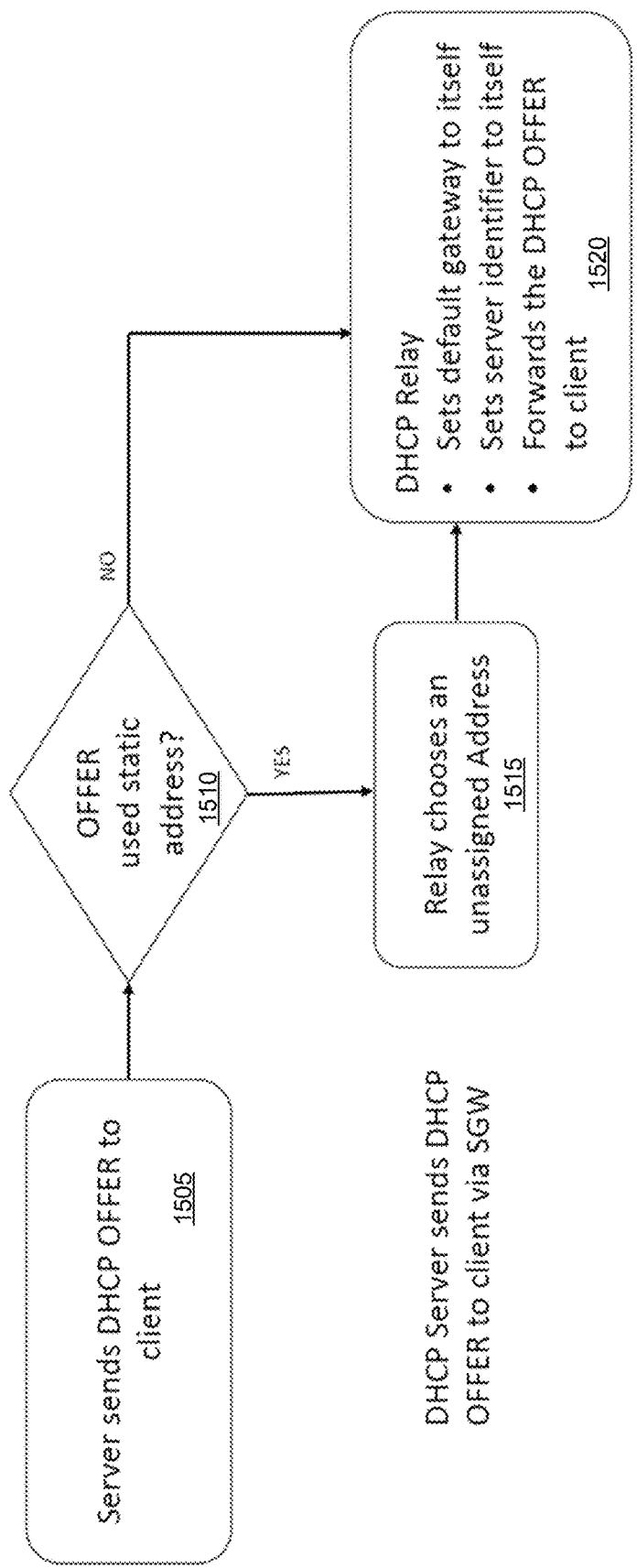
FIG. 15 is a flowchart of an example method related to a DHCP server sending a DHCP Offer to a client in accordance with an implementation.

FIG. 15 is a method flow chart of a method of the DHCP server sending a DHCP OFFER to a client via the DHCP relay. In block 1505 the DHCP server sends DHCP OFFER to client. In decision block 1510 a determination is made whether or not the OFFER uses a static address. If yes, the process moves to block 1515, and the DHCP relay chooses an unassigned address, then moves to block 1520. If no, the process moves to block 1520, and the DHCP relay sets the default gateway to itself, sets server identifier to itself, and forwards the DHCP OFFER to the client.

Figure 16:
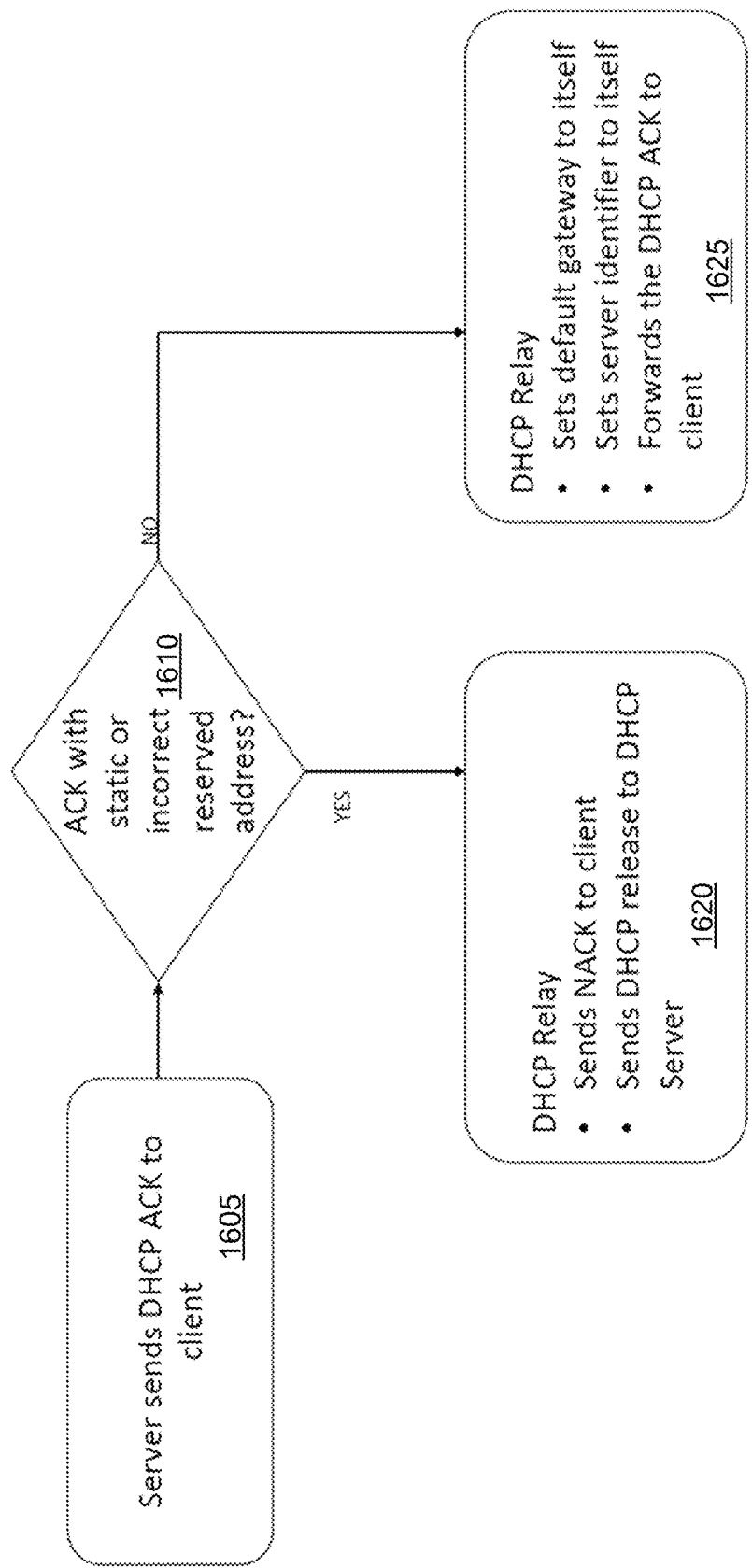
FIG. 16 is a flowchart of a DHCP server sending a DHCP Ack to a client via the security appliance.

FIG. 16 is a flowchart of an example of the DHCP server sending a DHCP ack to the client via the DHCP relay. In block 1605, the DHCP server sends a DHCP ACK to the client. In decision block 1610, a decision is made whether the ACK has a static or incorrect reserved address. If yes, the DHCP relay sends a NACK to the client and sends a DHCP release to the DHCP server in block 1620. If the answer is no, the process moves to block 1625 and the DHCP relay sets the default gateway to itself, sets the server identifier to itself, and forwards the DHCP ACK to the client.

Figure 17:
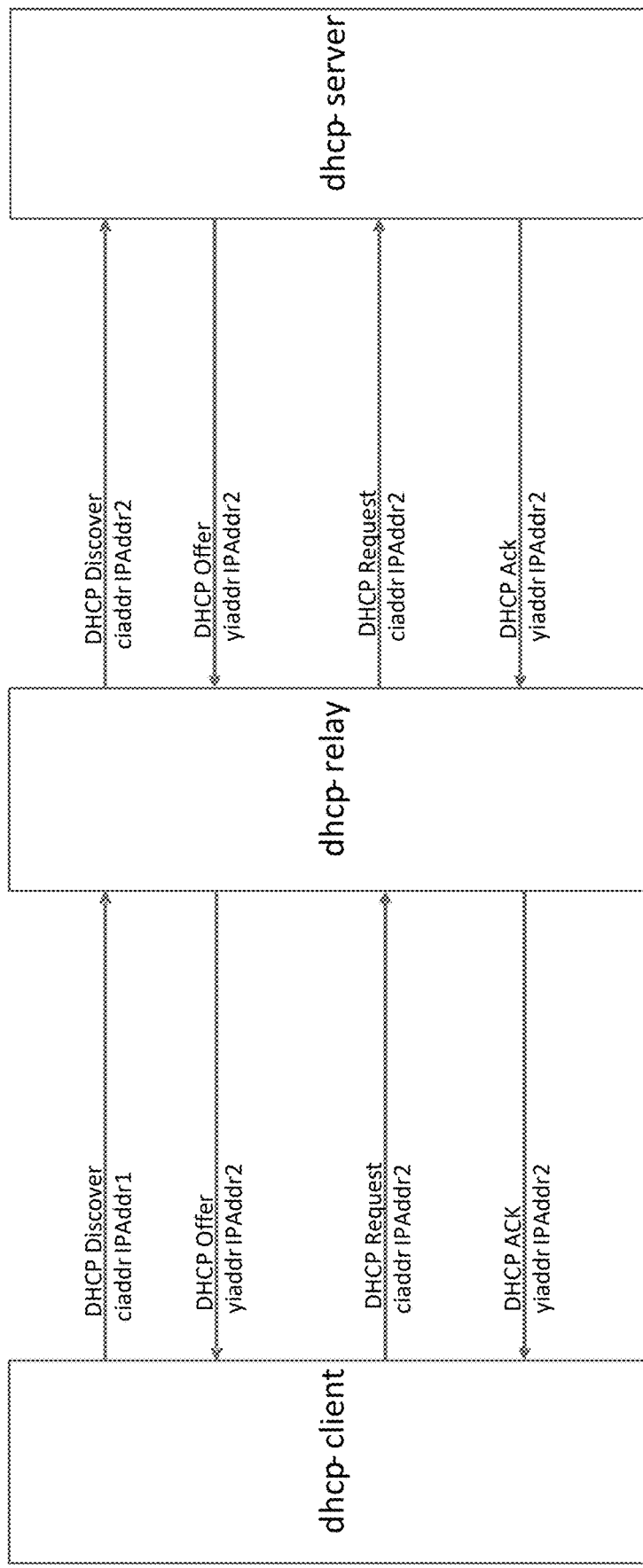
FIG. 17 is an interaction diagram illustrating interactions between a DHCP client, a DHCP relay, and DHCP server for a client requesting an address already in use in accordance with an implementation.
Figure 18:
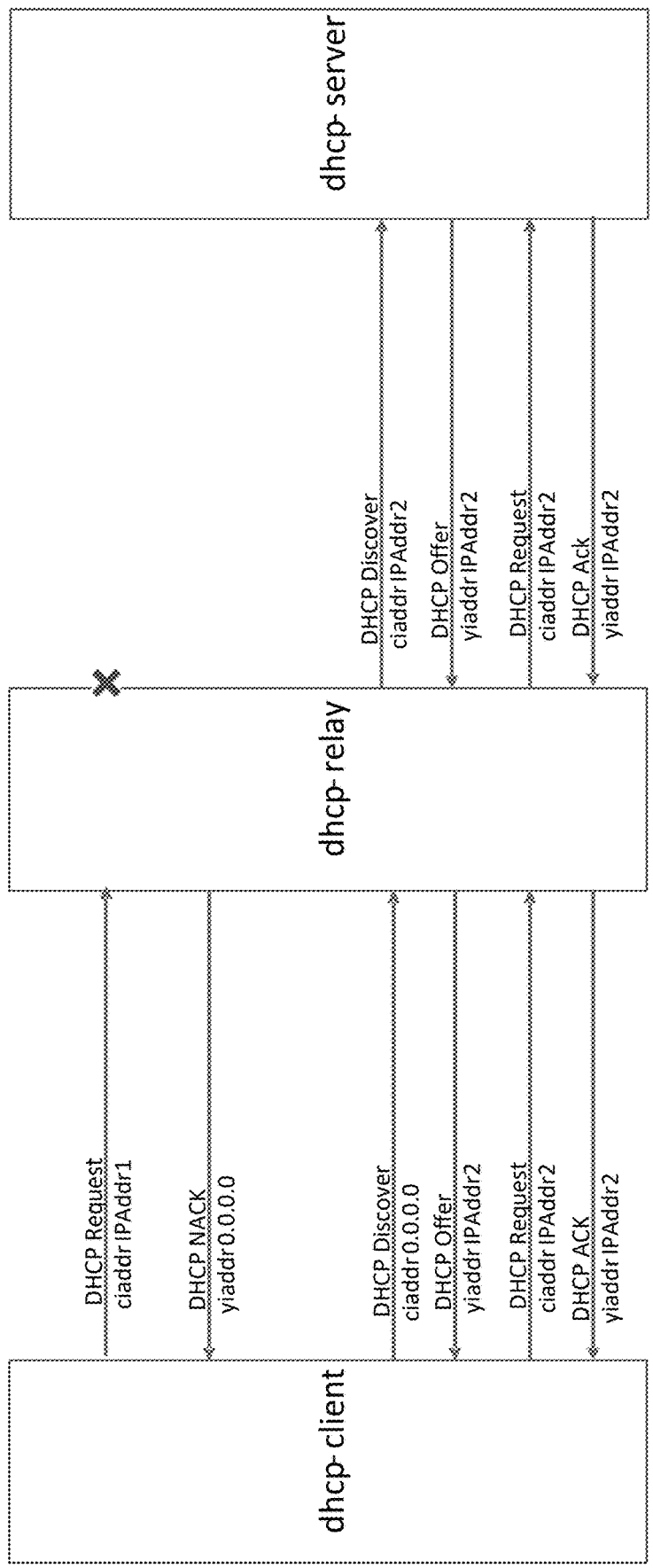
FIG. 18 is an interaction diagram illustrating interactions between a DHCP client, a DHCP relay, and DHCP server for a client requesting renewal in accordance with an implementation.
Figure 19:
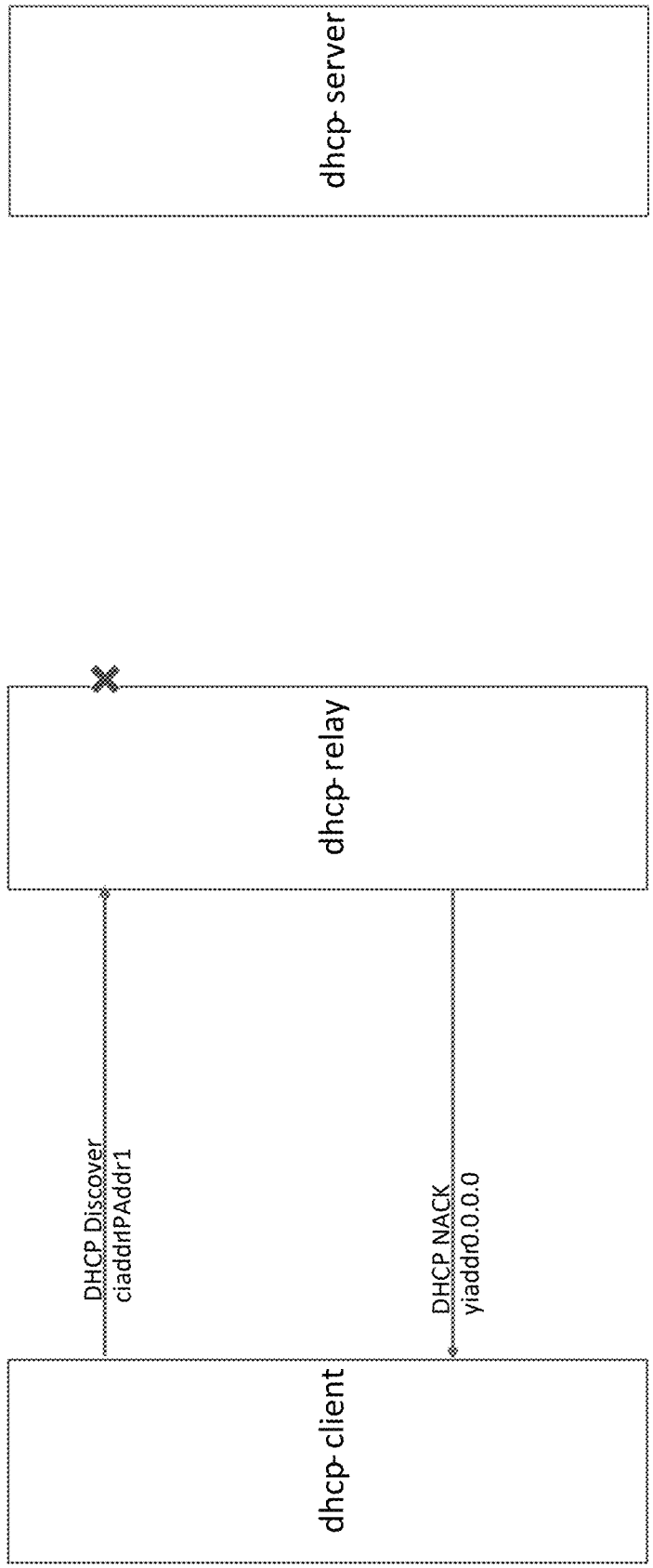
FIG. 19 is an interaction diagram illustrating interactions between a DHCP client, a DHCP relay, and DHCP server when a DHCP relay is instructed to reject onboarding of a client.

FIGS. 17, 18, and 19 are interaction diagrams illustrating the packet flows for three examples while the flow charts of FIGS. 14, 15, and 16 are flow chart representations of three examples. Referring to the interaction diagram of FIG. 17, consider two examples. First, when a new device is requesting an IP address that is already in use by another DHCP device (or even a device with an IP address statically assigned), the DHCP relay can pick an address being requested to the DHCP server. As another example, consider when a client device has a different reserved address on the DHCP server. In these examples, the DHCP relay function on the security application changes the requested IP address to an appropriate one. This is illustrated in the interaction diagram of FIG. 18. FIG. 18 is an interaction diagram for the situation of a client requesting a renewal of an IP address after the client is reassigned to a different reserved address. FIG. 19 is an interaction diagram illustrating an example in which the DHCP relay issues an instruction to reject onboarding of a client by issuing a DHCP NACK.

Blackhole Address Quarantining

As previously discussed, in one implementation client endpoint devices of a VLAN have tightly controlled subnet mask (255.255.255.255) using the security appliance 150 as a default gateway. This is achieved by the security appliance 150 performing a DHCP Relay function. The traditional DHCP Relay does not modify the DHCP assignments; the previously described example of the security appliance modifies the subnet mask (but not the client address assignment) to achieve endpoint isolation. Endpoint isolation using the subnet mask (255.255.255.255) means that VLAN client endpoint devices cannot send data packets to each other without routing through the security appliance 150.

There are occasions when specific endpoints are quarantine candidates in the sense that such endpoints are not to be used to send data to any other endpoints in the network. Some use cases include: 1) detecting that an endpoint is compromised with ransomware (or likely to be compromised); and 2) when a new endpoint is staged (powered up and online) but should not be put into production until a later time.

In one implementation, a modified DHCP Relay operation is used to achieve the quarantining of such endpoints. This can also be described in terms of DHCP Relay Enhancements to facilitate client endpoint device quarantine that have less overhead on the security appliance 150.

In one implementation, a network administrator in a configuration step configures the client address allocations and their associated parameters, netmasks, default gateway, lease times, etc., on the DHCP server. For networks utilizing DHCP relays for clients to communicate with the DHCP server, the DHCP Relay sits between the clients and the DHCP server. Since a DHCP Relay connects to the broadcast domain the clients also reside in, they are better positioned to monitor the IP Address usages in the broadcast domain.

In one implementation, the security appliance 150 enhances the operation of the DHCP Relay to incorporate the DHCP address allocation configurations and track and police the current IP address usages, making sure that unwarranted data would not be sent by endpoints that should be quarantined.

In one implementation, a blackhole default gateway address is assigned to the endpoints that are to be quarantined. A blackhole default gateway address is a predefined "dead" IP address in which incoming or outgoing traffic is discarded without informing the source that the data did not reach its intended recipient.

Figure 20:
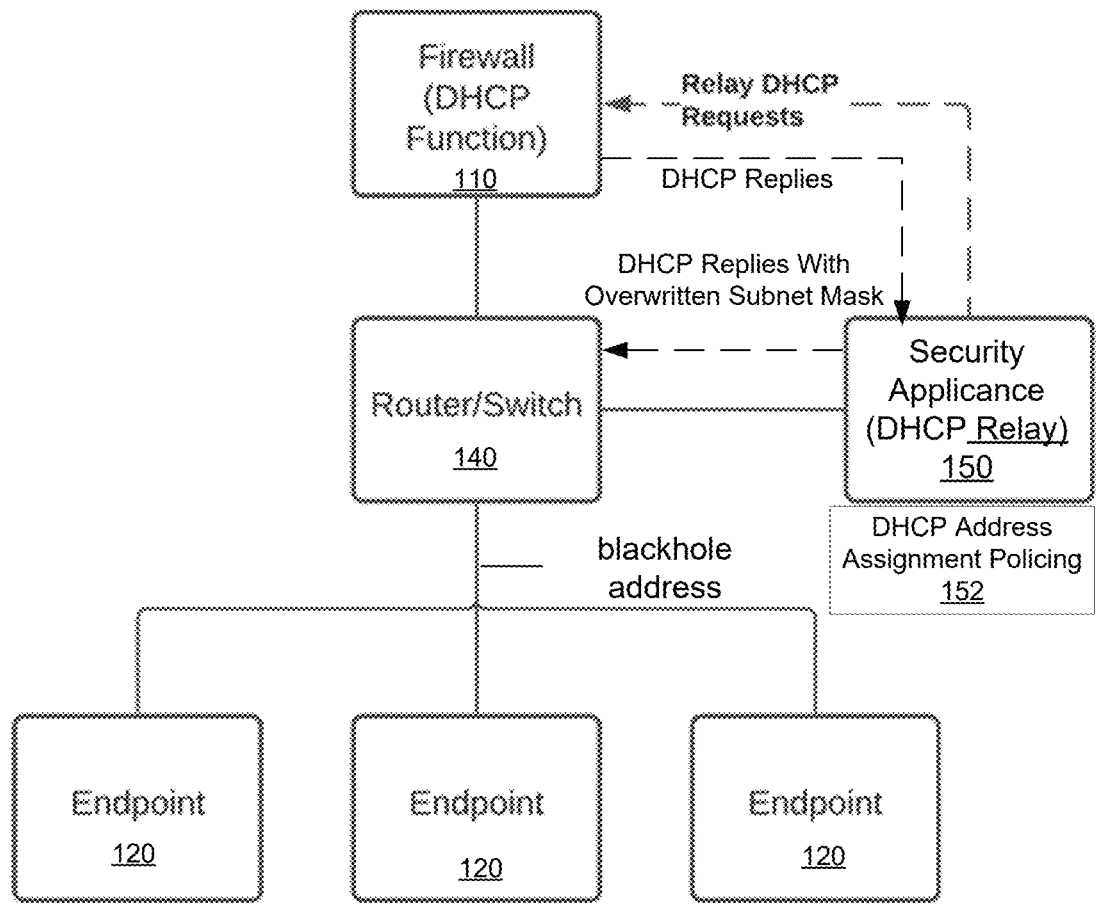
FIG. 20 illustrates a system with a blackhole IP address.

Referring to FIG. 20, in one implementation network administrators configure the DHCP Relay with the MAC addresses of client endpoint devices that are to be staged and the time when the endpoint can be put into production. For these endpoints, the endpoints can be assigned the blackhole default gateway.

The security appliance 150 also continually monitors the traffic sent by and to production client device endpoints. If any of these production endpoints are detected to be compromised (e.g., a determination is made if one or more endpoints are likely to be infected with ransomware and should be quarantined), they should be quarantined by being assigned with the blackhole default gateway. The detection whether an endpoint is compromised can be performed using any of the previously described techniques, such as detecting if the message traffic of the client endpoint device exhibits unusual behavior indicating it is likely infected with ransomware. The compromised endpoints can also be assigned the blackhole default gateway for subsequent DHCP renewals.

For example, when the DHCP Relay receives a DHCP request for an IP address from these 2 types of endpoints (staged and compromised), the DHCP Relay will relay them to the DHCP Server; when the DHCP Relay receives the DHCP OFFER/ACK from the DHCP Server, it replaces the default gateway value assigned by the DHCP server with the blackhole default gateway address.

In one implementation, for the case of staged endpoints, it is optional for the DHCP Relay to change the lease-time to be double the time-interval of the remaining time before the endpoint is to be put into production so that when the endpoint sends its automatic renewal when half of the lease-time has transpired, the new lease contains the regular default gateway value. For the compromised endpoints, the lease-time does not need to be altered.

After the client endpoints adopt the assigned blackhole address as the default gateway address, data traffic cannot be sent by these client endpoints onto the network. This is because—with the absence of any devices hosting the blackhole IP address, attempts to resolve the MAC address of the blackhole IP address would fail.

Figure 21:
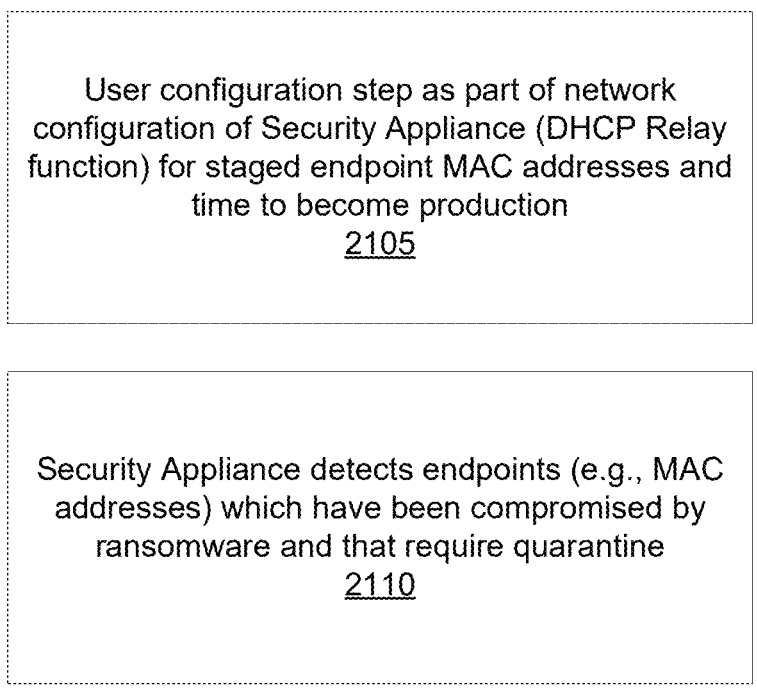
FIG. 21 illustrates aspects of network administration in accordance with an implementation.

Referring to FIG. 21, a network administrator may configure the MAC addresses of staged endpoint devices as illustrated in block 2105. In some implementations, the network administrator may also state a time for endpoints to become production endpoints. The staged endpoints are assigned the blackhole address while they are in the staged mode. In block 2110, the security appliance detects the MAC addresses of endpoint devices that have been compromised and require quarantine. The compromised endpoint devices are assigned the blackhole IP gateway address.

Figure 22:
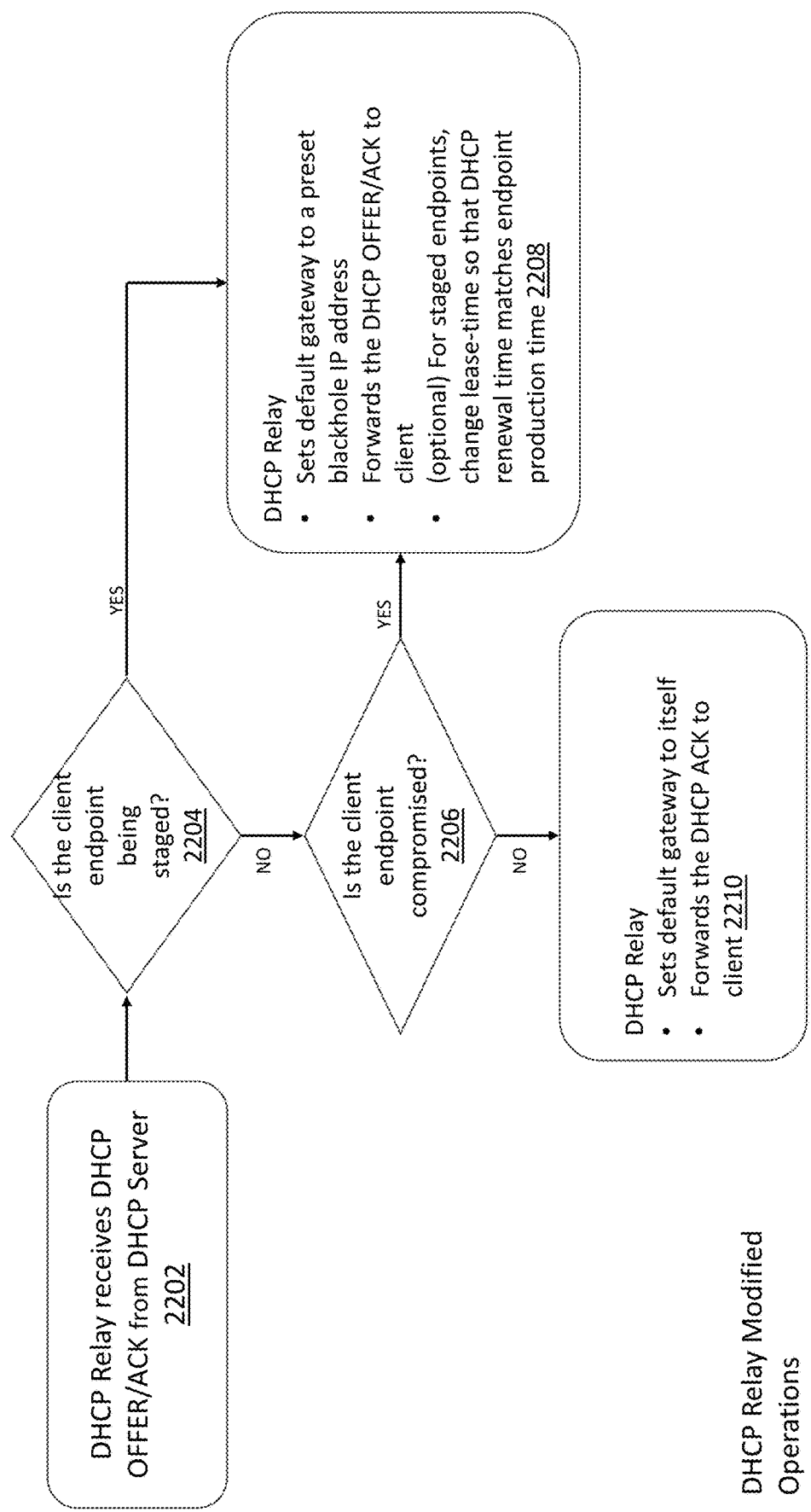
FIG. 22 is flowchart of an example method of assigning a blackhole IP address in accordance with an implementation.

FIG. 22 is a flowchart in accordance with an implementation. In block 2202, a DHCP Relay receives DHCP OFFER/ACK requests from a DHCP Server. It determines in decision block 2204 if the client endpoint is being staged. If yes, then in block 2208, the DHCP Relay sets the default gateway for the client endpoint to the preset blackhole IP address. In addition, it sets the subnet mask to 255.255.255.255, and it forwards the DHCP OFFER/ACK to the client. It may also optionally for staged endpoints change the lease-time so that the DHCP renewal time matches the endpoint production. If No, the process may then move on to making a decision whether the client endpoint is compromised in block 2206. If yes, the flow moves to block 2208, If no, in block 2210, the DHCP Relay sets the default gateway to itself, which may, as previously discussed, include setting the subnet mask to 255.255.255.255. The DHCP Relay forwards the DHCP ACK to the client.

As previously discussed, the security appliance may implement the DHCP Relay function, through the security appliance, may also detect compromised endpoint devices. The process may be repeated over all the endpoint devices. In terms of implementation details, the ordering of blocks 2204 and 2206 may be varied from that shown to place block 2206 before block 2204. Also, the process does not necessarily have to implement a blackhole address default gateway for staged devices, as staged devices could be handled using other techniques.

Using the blackhole IP address default gateway for quarantining endpoint devices provides a number of benefits. The quarantine methods could use firewall rules on the security appliance to block any unwanted data traffic. However, using firewall rules has the disadvantage of requiring firewall resources. In contrast, in an improved implementation when the client endpoint acquires the DHCP lease, the 255.255.255.255 netmask is used for non-compromised, non-staged endpoint devices, with a blackhole IP address as the default-gateway for compromised and/or staged endpoint devices. This prevents the compromised and/or staged client endpoint to initiate data traffic to any other endpoints. This reduces the I/O load on the security appliance to isolate endpoint devices. In some implementations, the firewall rules on the security appliance become a secondary defense.

In one implementation, for the staged client endpoints, when the DHCP Relay times the client renewal and sets the lease-time for these clients to be $2x$ the remaining time until production time, this automatically takes the staged client endpoints to production at the predesignated time. This allows a staged client endpoint to be online without putting it in production until the predesignated production time.

For the compromised client endpoints, the lease-time is not a concern since there is no predesignated time when the endpoint can be sanitized.

Another advantage is that the DHCP Server does not need to be changed in its implementation or operations. The only setting on the DHCP Server is that the blackhole IP address is not in the DHCP address pool. The rest of the DHCP operations are performed by the DHCP Relay residing on the Airgap Security Appliance and does not need to be made aware to the DHCP Server.

It will be understood that the firewall rules of the security appliance may remain a secondary defense. For example, the security appliance may monitor message traffic and detect message traffic from an endpoint device indicative of the endpoint device being compromised. Initially, the security appliance may quarantine the compromised endpoints device using firewalls rules. However, upon a DHCP lease renewal, the compromised endpoint devices May be assigned the blackhole IP address, which reduces the workload and resources on the security appliance to maintain isolation/quarantine of endpoint devices in a VLAN compromised with ransomware.

ALTERNATE EMBODIMENTS

As previously discussed, the DHCP address policing may be performed in a secure gateway. Generally speaking, alternate implementation requires the DHCP relay to be able to intercept all DHCP exchanges between the client and the server. However, there are other possible locations in which the DHCP address policing may be performed, such as on an L2 switch connecting a server to a client. However, L2 switches normally do not examine the L3 header where the DHCP data resides. An L2 switch would require modification to implement the functionality for DHCP address policing.

Other implementations of one or more of these aspects include corresponding systems, apparatus, and computer programs, configured to perform the actions of the methods, encoded on computer storage devices.

These and other implementations may each optionally include one or more of the following features.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware.

Reference in the specification to "one embodiment", "some embodiments" or "an embodiment" means that a particular feature, structure, or characteristic described in connection with the embodiment is included in at least some embodiments of the disclosed technologies. The appearances of the phrase "in some embodiments" in various places in the specification are not necessarily all referring to the same embodiment.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers, or the like.

These and similar terms can be associated with the appropriate physical quantities and can be considered labels applied to these quantities. Unless specifically stated otherwise as apparent from the prior discussion, it is appreciated that throughout the description, discussions utilizing terms, for example, "processing" or "computing" or "calculating" or "determining" or "displaying" or the like, may refer to the processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer.

The disclosed technologies can take the form of an entirely hardware implementation, an entirely software implementation or an implementation containing both software and hardware elements. In some implementations, the technology is implemented in software, which includes, but is not limited to, firmware, resident software, microcode, etc.

Furthermore, the disclosed technologies can take the form of a computer program product accessible from a non-transitory computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor (e.g., a hardware processor) coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be implemented in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method of ransomware protection in a Virtual Local Area Network (VLAN), comprising:

configuring a security appliance as a Dynamic Host Configuration Protocol (DHCP) relay for a DHCP server in a VLAN;

receiving, by the security appliance, responses from the DHCP server to DHCP requests;

overwriting, by the security appliance, a subnet mask to 255.255.255.255 to set the security appliance as a default gateway for a plurality of endpoint devices of the VLAN;

monitoring, by the security appliance, message traffic of the plurality of endpoint devices;

responsive to detecting one or more endpoint devices of the plurality of endpoint devices being compromised by ransomware based on the monitoring, quarantining, by the security appliance, the one or more endpoint devices compromised by ransomware, the quarantining including assigning a blackhole Internet Protocol (IP) address as the default gateway to the one or more compromised endpoint devices.

2. The method of claim 1, further comprising assigning powered up and online endpoint devices a blackhole IP address as the default gateway.

3. The method of claim 1, wherein the DHCP relay associated with the security appliance 1) receives a DHCP OFFER/Acknowledgement (ACK), and 2) in response to receiving the DHCP OFFER/ACK determines if an associated endpoint is not powered up and online and is not compromised, and 3) sets the default gateway address to itself, itself being the DHCP relay, and forwards the DHCP ACK to the associated endpoint.

4. The method of claim 1, wherein the DHCP relay associated with the security appliance 1) receives a DHCP OFFER/Acknowledgement (ACK), and 2) in response to receiving the DHCP OFFER/ACK determines an associated endpoint either is powered up and online or is compromised, sets the default gateway address to a preset blackhole IP address, and 3) forwards the DHCP OFFER/ACK to the associated endpoint.

5. The method of claim 1, wherein the DHCP relay associated with the security appliance 1) receives a DHCP OFFER/Acknowledgement (ACK), and 2) in response to receiving the DHCP OFFER/ACK determines if an associated endpoint is not compromised, and 3) sets the default gateway address to itself, itself being the DHCP relay, and forwards the DHCP ACK to the associated endpoint.

6. The method of claim 1, wherein the DHCP relay associated with the security appliance 1) receives a DHCP OFFER/Acknowledgement (ACK), and 2) in response to receiving the DHCP OFFER/ACK determines an associated endpoint is compromised, sets the default gateway address to a preset blackhole IP address, and 3) forwards the DHCP OFFER/ACK to the associated endpoint.

7. The method of claim 1, further comprising intercepting, by the security appliance, DHCP packets between the DHCP server and the plurality of endpoint devices and policing, by the security appliance, 1) IP addresses requested by the plurality of endpoint devices, and 2) IP addresses proposed by the DHCP server; and wherein the policing of IP address assignments by the security appliance is selected to aid in protecting the security of the endpoint devices from ransomware.

8. The computer-implemented method of claim 7, further comprising configuring IP addresses of the DHCP server and the DHCP relay to include at least one of a dynamic IP address pool, reserved IP addresses, Media Access Control (MAC) addresses, and static IP addresses.

9. The computer-implemented method of claim 1, further comprising:

detecting, by the security appliance, lateral propagation of ransomware between the plurality of endpoint devices via intra-VLAN communication in the VLAN.

10. A system for ransomware protection in a Virtual Local Area Network (VLAN), comprising:

A router associated with the VLAN hosting a security appliance acting as a Dynamic Host Configuration Protocol (DHCP) relay for a DHCP server in the VLAN network;

the security appliance being stored on memory and executed on a processor of the router, and serving as a default gateway for a plurality of endpoint devices of the VLAN by overwriting a subnet mask to 255.255.255.255 to set the security appliance as a default gateway;

the security appliance configured to monitor message traffic of the plurality of endpoint devices, detect one or more endpoint devices of the plurality of endpoint devices compromised by ransomware, and implement a quarantine protocol that includes assigning, in a DHCP renewal, a blackhole Internet Protocol (IP) address as the default gateway to endpoint devices compromised by ransomware.

11. The system of claim 10, wherein the security appliance is configured to assign powered up and online endpoint devices a blackhole IP address as the default gateway.

12. The system of claim 10, wherein the DHCP relay associated with the security appliance is configured to 1) receive a DHCP OFFER/Acknowledgement (ACK), and 2) in response to receiving the DHCP OFFER/ACK determine an associated endpoint is compromised, set the default gateway address to a preset blackhole IP address, and 3) forward the DHCP OFFER/ACK to the associated endpoint.

13. The system of claim 10, wherein the security appliance is configured to 1) receive a DHCP OFFER/ACK, and 2) in response to receiving the DHCP OFFER/ACK determine if an associated endpoint is not compromised, and 3) set the default gateway address to itself, itself being the security appliance, and forward the DHCP ACK to the associated endpoint.

14. A computer-implemented method of ransomware protection in a Virtual Local Area Network (VLAN), comprising:

configuring a Dynamic Host Configuration Protocol (DHCP) relay to have a security function to monitor for ransomware in message traffic;

configuring the DHCP relay for a DHCP server in a VLAN to have a modified relay operation, including;

receiving a DHCP OFFER/Acknowledgement (ACK), and 2) determining whether an associated endpoint is powered up and online or is compromised with ransomware, 3) in response to determining the associated endpoint is not powered up and online and is not compromised with ransomware, setting default gateway to be the DHCP relay and forwarding the DHCP ACK to the associated endpoint, and 4) in response to determining the associated endpoint being either powered up and online or being compromised with ransomware, setting the default gateway to a preset blackhole IP address, and forwarding the DHCP OFFER/ACK to the associated endpoint.

* * * * *